(12) United States Patent
Kim et al.

(10) Patent No.: US 9,143,771 B2
(45) Date of Patent: Sep. 22, 2015

(54) IMAGE DISPLAY DEVICE AND METHOD FOR OPERATING THE SAME

(75) Inventors: Hyungoon Kim, Seoul (KR); Gwangmi Go, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 274 days.

(21) Appl. No.: 13/028,405

(22) Filed: Feb. 16, 2011

(65) Prior Publication Data

US 2011/0205335 A1     Aug. 25, 2011

Related U.S. Application Data

(60) Provisional application No. 61/305,967, filed on Feb. 19, 2010.

(51) Int. Cl.
*H04N 13/00* (2006.01)
*H04N 13/04* (2006.01)

(52) U.S. Cl.
CPC ....... *H04N 13/0497* (2013.01); *H04N 13/0438* (2013.01)

(58) Field of Classification Search
CPC ................. H04N 13/0438; H04N 13/0497
USPC ........... 348/42, 43, 55, 56; 345/102, 690, 691
See application file for complete search history.

(56) References Cited

U.S. PATENT DOCUMENTS

| 7,616,172 | B2 * | 11/2009 | Lin et al. ........................... 345/8 |
| 8,373,684 | B2 * | 2/2013 | Kim et al. ...................... 345/204 |
| 2007/0279340 | A1 * | 12/2007 | Takahashi et al. .............. 345/76 |
| 2008/0303963 | A1 | 12/2008 | Jung et al. ....................... 349/13 |
| 2010/0020062 | A1 | 1/2010 | Liou et al. ...................... 345/213 |
| 2010/0026929 | A1 * | 2/2010 | Nagata et al. .................... 349/61 |
| 2010/0033461 | A1 | 2/2010 | Hasegawa et al. ............. 345/211 |
| 2010/0110112 | A1 * | 5/2010 | Nakanishi ...................... 345/690 |
| 2011/0057965 | A1 * | 3/2011 | Park et al. ...................... 345/690 |

(Continued)

FOREIGN PATENT DOCUMENTS

| CN | 101650922 A | * | 2/2010 |
| CN | 102036087 A | | 4/2011 |
| CN | 102111627 A | | 6/2011 |
| EP | 2 228 998 A2 | | 9/2010 |

(Continued)

OTHER PUBLICATIONS

Chen et al. "3-D Mobile Display Based on Moiré-Free Dual Directional Backlight and Driving Scheme for Image Crosstalk Reduction". Journal of Display Technology, Mar. 2008, vol. 4, No. 1, pp. 92-96.*

(Continued)

*Primary Examiner* — Christopher S Kelley
*Assistant Examiner* — Zhihan Zhou
(74) *Attorney, Agent, or Firm* — KED & Associates, LLP

(57) ABSTRACT

An image display device and a method for operating the same are disclosed. The method for operating the image display device including a plurality of backlight lamps arranged on upper and lower sides of a rear surface of a display panel includes receiving a 3-Dimensional (3D) image, alternately aligning a left-eye image and a right-eye image of the 3D image, and alternately displaying the aligned left- and right-eye images. In the displaying step, the backlight lamps arranged on the upper side of the panel and the backlight lamps arranged on the lower side of the panel are turned on in a portion of a period of the left-eye image or the right-eye image.

8 Claims, 20 Drawing Sheets

(56) References Cited

U.S. PATENT DOCUMENTS

2011/0157332 A1* 6/2011 Kim et al. .................. 348/56
2011/0193897 A1* 8/2011 Park et al. .................. 345/691

FOREIGN PATENT DOCUMENTS

| WO | WO 2009072296 A1 * | 6/2009 |
| WO | WO 2010/107227 A2 | 9/2010 |

OTHER PUBLICATIONS

Shang et al. CN101650922 English Abstract and Full Text Machine Translation. Feb. 17, 2010.*
Chinese Office Action dated Apr. 9, 2013 issued in Application No. 201110040602.6.
Chinese Office Action dated Sep. 13, 2013 for corresponding Application No. 201110040602.6.

* cited by examiner

FIG. 5
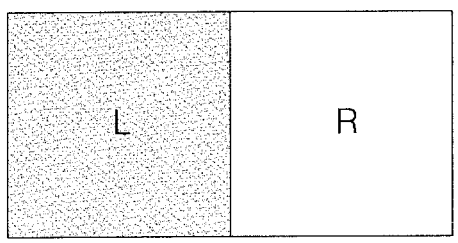
(a)
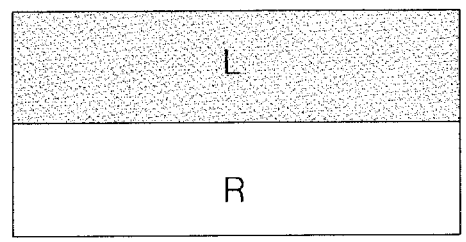
(b)
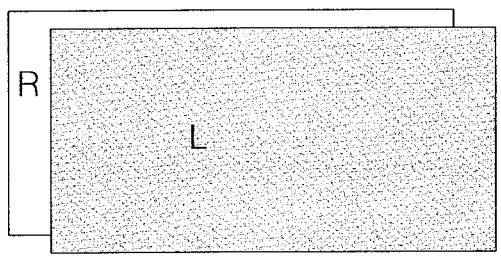
(c)
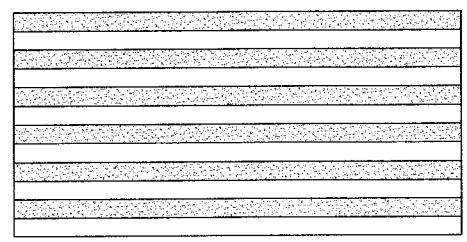
(d)
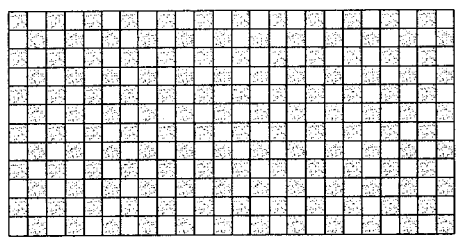
(e)

FIG. 6
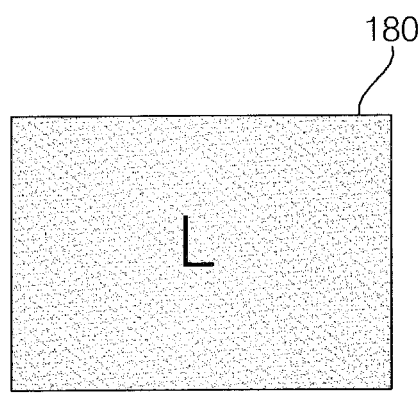
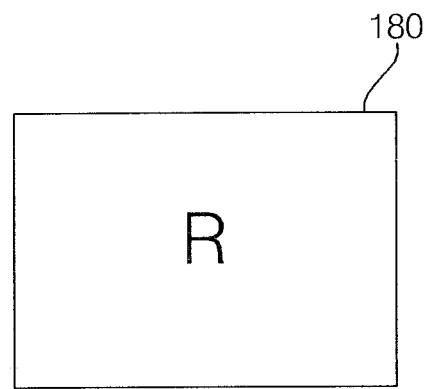
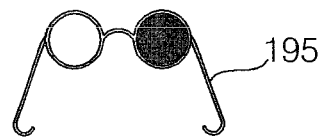
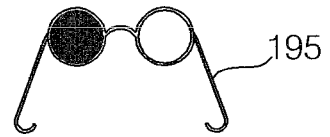
(a)                      (b)

FIG. 8
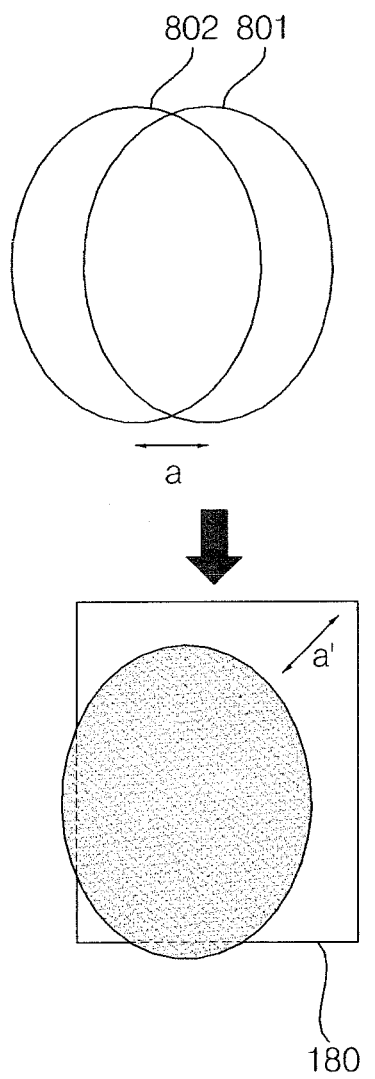
(a)
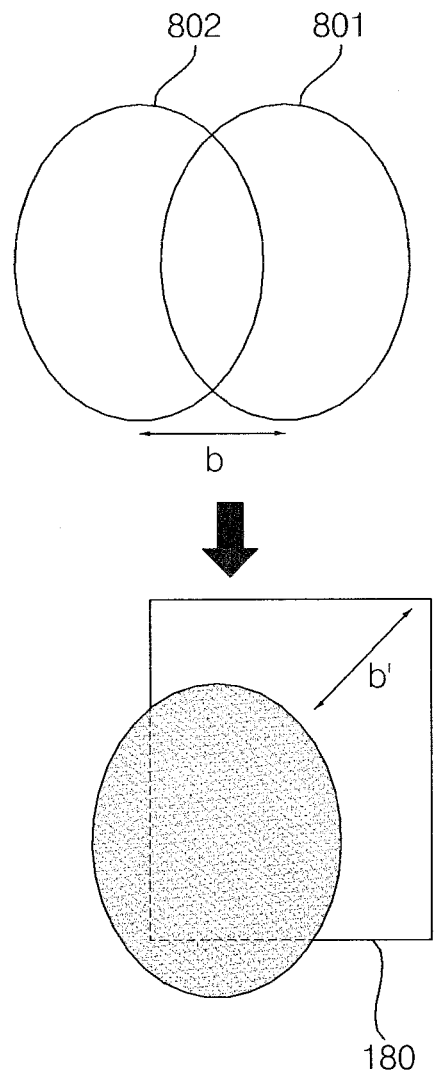
(b)

FIG. 11
(a) 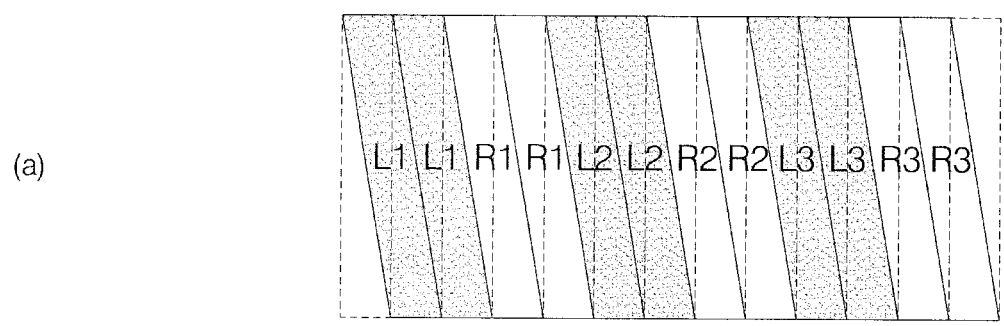
(b) LIQUID CRYSTAL RESPONSE 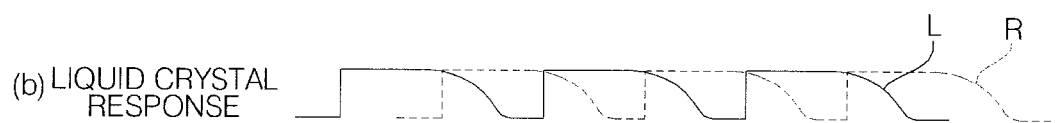
(c) Backlight on/off 

(a)

(b) Backlight on/off

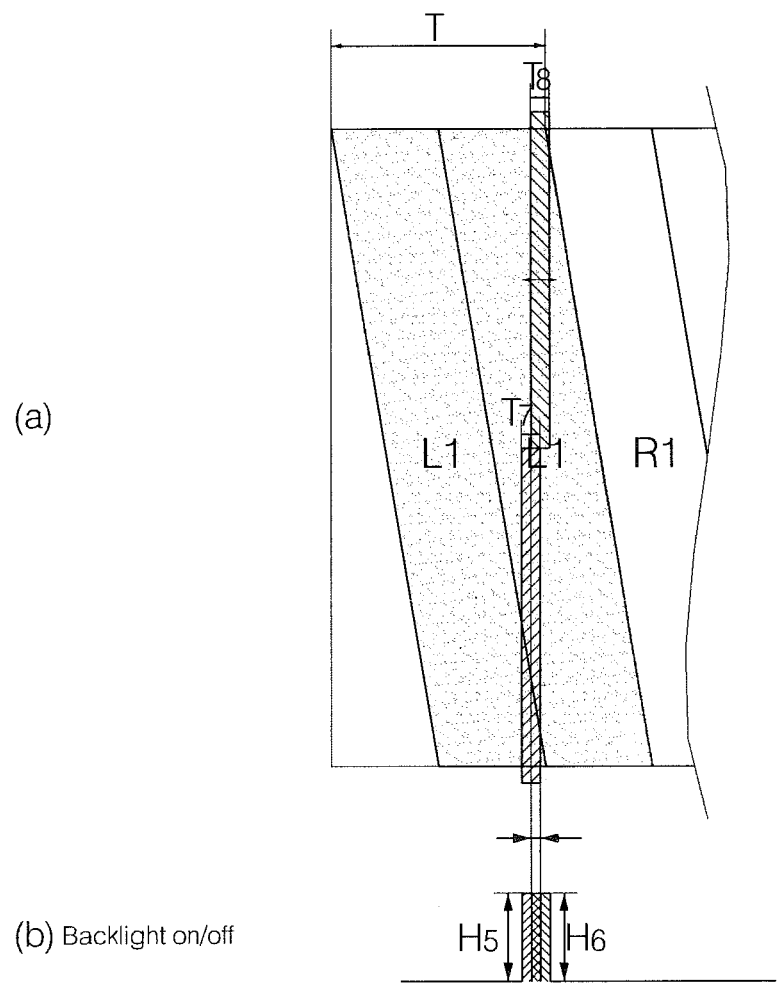

IMAGE DISPLAY DEVICE AND METHOD FOR OPERATING THE SAME

CROSS-REFERENCE TO RELATED APPLICATION

This application claims the priority benefit of U.S. Provisional Application No. 61/305,967 filed on Feb. 19, 2010 in the USPTO, the disclosure of which is incorporated herein by reference.

BACKGROUND OF THE INVENTION

1. Field of the invention

The present invention relates to an image display device and a method for operating the same, and more particularly to an image display device, which is capable of reducing crosstalk when a 3-Dimensional (3D) image is displayed, and a method for operating the same.

2. Description of the Related Art

An image display device includes a function for displaying a viewable image to a user. The user can view a broadcast using the image display device. The image display device displays a broadcast, which is selected by the user from broadcast signals transmitted from a broadcast station, on a display. Currently, analog broadcasting is being phased out in favor of digital broadcasting.

A digital broadcast refers to a broadcast for transmitting digital video and audio signals. The digital broadcast has low data loss due to robustness against external noise, advantageous error correction, high-resolution screen, as compared with an analog broadcast. In addition, the digital broadcast can provide a bidirectional service unlike the analog broadcast.

Recently, research into stereoscopic images has been actively conducted. In addition, in various environments and technologies as well as a computer graphics field, the stereoscopic image technology has become increasingly common and put to practically use.

SUMMARY OF THE INVENTION

Therefore, the present invention has been made in view of the above problems, and it is an object of the present invention to provide an image display device, which is capable of reducing crosstalk when a 3-Dimensional (3D) image is displayed, and a method for operating the same.

It is another object of the present invention to provide an edge type image display device including a hold type liquid crystal panel and backlight lamps arranged on upper and lower sides of the panel, which is capable of reducing crosstalk, and a method for operating the same.

It is another object of the present invention to provide an image display device, which is capable of improving luminance when a 3D image is displayed, and a method for operating the same.

It is another object of the present invention to provide an image display device, which is capable of reducing instantaneous load when backlight lamps are driven, and a method for operating the same.

In accordance with an aspect of the present invention, the above and other objects can be accomplished by the provision of a method for operating an image display device including a plurality of backlight lamps arranged on upper and lower sides of a rear surface of a display panel, the method including: receiving a 3-Dimensional (3D) image, alternately aligning a left-eye image and a right-eye image of the 3D image, and alternately displaying the aligned left- and right-eye images, wherein, in the displaying step, the backlight lamps arranged on the upper side of the panel and the backlight lamps arranged on the lower side of the panel are turned on in a portion of a period of the left-eye image or the right-eye image.

In accordance with another aspect of the present invention, there is provided a method for operating an image display device including a plurality of backlight lamps arranged on upper and lower sides of a rear surface of a display panel, the method including: receiving a 2-Dimensional (2D) image, displaying the 2D image, receiving a 3-Dimensional (3D) image, alternately aligning a left-eye image and a right-eye image of the 3D image, and alternately displaying the aligned left- and right-eye images, wherein the level of current flowing in the lamps per unit frame when the 3D image is displayed is greater than that when the 2D image is displayed.

In accordance with another aspect of the present invention, there is provided an image display device including: a formatter configured to alternately align a left-eye image and a right-eye image of a 3-Dimensional (3D) image, and a display configured to alternately display the aligned left- and right-eye images, wherein the display includes a plurality of backlight lamps arranged on upper and lower sides of a rear surface of a display panel, and wherein the backlight lamps arranged on the upper side of the panel and the backlight lamps arranged on the lower side of the panel are turned on in a portion of a period of the left-eye image or the right-eye image.

According to the embodiments of the present invention, in order to alternately align and display the left-eye image and the right-eye image of the 3D image, the backlight lamps arranged on the upper and lower sides of the panel are turned on in the portion of the period of the aligned left- and right-eye image, thereby preventing crosstalk in which adjacent images are displayed when the 3D image is displayed.

By setting the level of current flowing in the backlight lamps when the 3D image is displayed to be greater than that when the 2D image is displayed, it is possible to improve luminance when the 3D image is displayed.

By turning the backlight lamps arranged on the upper side of the panel and the backlight lamps arranged on the lower side of the panel on to be driven at different times by scanning drive, it is possible to reduce instantaneous load when the backlight lamps are driven and, as a result, to reduce power consumption when the lamps are driven.

By increasing the frame rate of the 3D image and consecutively arranging the same left-eye image frames and the same right-eye image frames, it is possible to prevent crosstalk in which adjacent images are displayed when the 3D image is displayed.

In particular, in a state in which the same left-eye image frames and the same right-eye image frames are consecutively arranged, the backlight lamps arranged on the upper side of the panel and the backlight lamps arranged on the lower side of the panel are turned on, in at least a last left-eye image frame of the consecutive left-eye image frames or at least a last right-eye image frame of the consecutive right-eye image frames. Accordingly, it is possible to prevent crosstalk in which adjacent images are displayed when the 3D image is displayed.

In addition, in a state in which the same left-eye image frames and the same right-eye image frames are consecutively arranged, using a boundary between the consecutive left-eye image frames or a boundary between the consecutive right-eye image frames as a reference, any backlight lamps of the backlight lamps arranged on the upper side of the panel and the backlight lamps arranged on the lower side of the panel are turned on before the boundary and the other backlight lamps are turned on after the boundary. Accordingly, it is possible to prevent crosstalk in which adjacent images are displayed when the 3D image is displayed.

BRIEF DESCRIPTION OF THE DRAWINGS

The above and other objects, features and other advantages of the present invention will be more clearly understood from the following detailed description taken in conjunction with the accompanying drawings, in which:

FIG. 5 is a diagram showing various formats of a 3D image;

FIG. 6 is a diagram showing an operation of shutter glasses according to a frame sequential format of FIG. 5;

FIG. 8 is a diagram illustrating the depth of a 3D image according to a distance between a left-eye image and a right-eye image;

FIGS. 10 to 20 are diagrams illustrating various examples of the method for operating the image display device of FIG. 9.

DETAILED DESCRIPTION OF THE PREFERRED EMBODIMENTS

Exemplary embodiments of the present invention will be described with reference to the attached drawings.

The terms "module" and "unit" as used to describe components herein are used to help the understanding of the components and thus they should not be considered as having specific meanings or roles. Accordingly, the terms "module" and "unit" may be used interchangeably.

Figure 1:
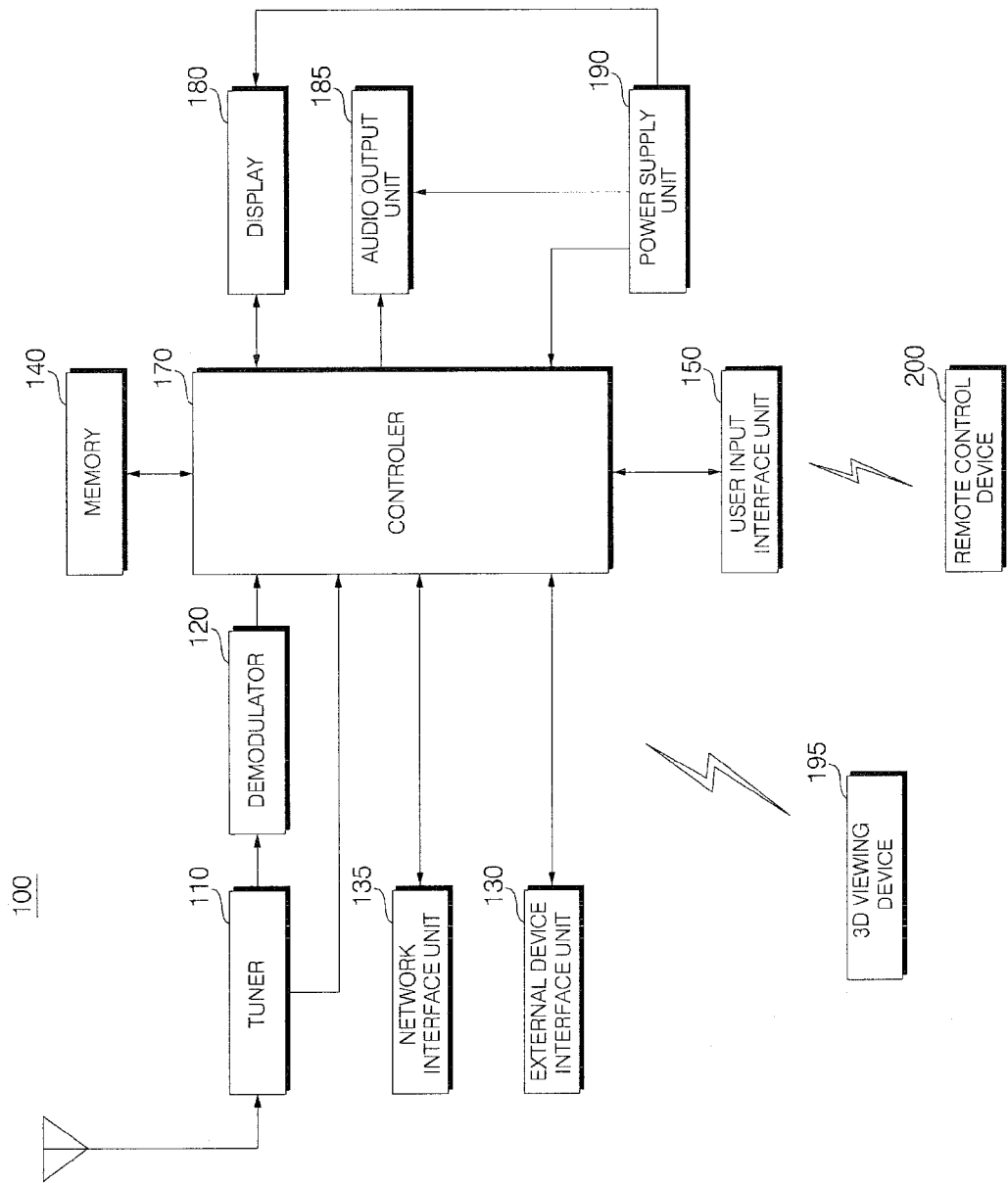
FIG. 1 a block diagram showing an image display device according to an embodiment of the present invention.

FIG. 1 a block diagram showing an image display device according to an embodiment of the present invention.

Referring to FIG. 1, the image display device 100 according to the embodiment of the present invention includes a tuner 110, a demodulator 120, an external device interface unit 130, a network interface unit 135, a memory 140, a user input interface unit 150, a controller 170, a display 180, an audio output unit 185, a power supply unit 190, and a 3D supplementary display 195.

The tuner 110 tunes to a Radio Frequency (RF) broadcast signal corresponding to a channel selected by a user from RF broadcast signals received through an antenna or each of all channels stored in advance. The tuned RF broadcast signal is converted into an Intermediate Frequency (IF) signal or a baseband video or audio signal.

For example, if the tuned RF broadcast signal is a digital broadcast signal, the tuned RF broadcast signal is converted into a digital IF (DIF) signal and, if the tuned RF broadcast signal is an analog broadcast signal, the tuned RF broadcast signal is converted into an analog baseband video/audio signal (Composite Video Baseband Signal (CVBS)/Sound IF (SIF)). That is, the tuner 110 may process a digital broadcast signal or an analog broadcast signal. The analog baseband video/audio signal (CVBS/SIF) output from the tuner 110 may be directly input to the controller 170.

In addition, the tuner 110 may receive an RF broadcast signal of a single carrier according to an Advanced Television System Committee (ATSC) system or an RF broadcast signal of multiple carriers according to a Digital Video Broadcasting (DVB) system.

The tuner 110 may sequentially tune to the RF broadcast signals of all the broadcast channels stored through a channel storage function among the RF broadcast signals received through the antenna, and convert the signals into IF signals or baseband video or audio signals, in the present invention.

The demodulator 120 receives the DIF signal converted by the tuner 110 and performs a demodulation operation.

For example, if the DIF signal output from the tuner 110 is based on the ATSC system, the demodulator 120 performs 8-Vestigal Side Band (VSB) modulation. In addition, the demodulator 120 may perform channel decoding. The demodulator 120 may include a trellis decoder, a deinterleaver, a Reed-Solomon decoder and the like and perform trellis decoding, deinterleaving and Reed-Solomon decoding.

For example, if the DIF signal output from the tuner 110 is based on the DVB system, the demodulator 120 performs Coded Orthogonal Frequency Division Multiple Access (COFDMA) modulation. In addition, the demodulator 120 may perform channel decoding. The demodulator 120 may include a convolutional decoder, a deinterleaver, a Reed-Solomon decoder and the like and perform convolutional decoding, deinterleaving and Reed-Solomon decoding.

The demodulator 120 may perform demodulation and channel decoding and output a Transport Stream (TS) signal. The TS signal may be a signal in which an image signal, an audio signal and a data signal are multiplexed. For example, the TS signal may be an MPEG-2 TS in which an MPEG-2 standard image signal, a Dolby AC-3 standard audio signal and the like are multiplexed. In detail, the MPEG-2 TS may include a 4-byte header and a 184-byte payload.

The demodulator 120 may separately include demodulators according to the ATSC system and the DVB system. That is, an ATSC modulator and a DVB demodulator may be included.

The TS signal output from the demodulator 120 may be input to the controller 170. The controller 170 performs demultiplexing, image/audio signal processing and the like, outputs an image through the display 180 and audio through the audio output unit 185.

The external device interface unit 130 may connect an external device to the image display device 100. The external device interface unit 130 may include an A/V input/output unit (not shown) or a wireless communication unit (not shown).

The external device interface unit 130 may be connected to the external device such as a Digital Versatile Disk (DVD) player, a Blu-ray player, a game console, a camcorder or a computer (notebook type computer) in a wired/wireless manner. The external device interface unit 130 sends an image signal, an audio signal or a data signal received from the connected external device to the controller 170 of the image display device 100. The image signal, the audio signal or the data signal processed by the controller 170 may be output to the connected external device. The external device interface unit 130 may include an A/V input/output unit (not shown) or a wireless communication unit (not shown).

The A/V input/output unit inputs the image signal and the audio signal of the external device to the image display device 100 and may include a Universal Serial Bus (USB) port, a CVBS terminal, a component terminal, an S-video terminal (analog), a Digital Visual Interface (DVI) terminal, a High Definition Multimedia Interface (HDMI) terminal, an RGB terminal, and a D-SUB terminal.

The wireless communication unit may perform wireless Local Area Network (LAN) communication with another electronic device. The image display device 100 may be connected to another electronic device over a network according to the communication standard such as Bluetooth, Radio Frequency Identification (RFID), Infrared Data Association (IrDA), Ultra Wideband (UWB), or ZigBee.

In addition, the external device interface unit 130 may be connected to various set-top boxes through at least one of the above-described various terminals so as to perform an input/output operation with the set-top boxes.

The external device interface unit 130 may transmit or receive data to or from the 3D supplementary display 195.

The network interface unit 135 provides an interface for connecting the image display device 100 to a wired/wireless network including an Internet network. The network interface unit 135 may include an Ethernet port, for connection with a wired network. For connection with a wireless network, the communication standard such as Wireless LAN (WLAN) (Wi-Fi), Wireless broadband (Wibro), World Interoperability for Microwave Access (Wimax), or High Speed Downlink Packet Access (HSDPA) may be used.

The network interface unit 135 may receive content or data provided by an Internet or content provider or a network manager over a network. That is, the network interface unit 135 may receive content such as movies, advertisements, games, VODs, or broadcast signals and information associated therewith provided by the content provider over a network. In addition, the network interface unit 135 may receive update information, and update file of firmware provided by the network manager. In addition, the network interface unit 135 may transmit data to the Internet or content provider or the network manager.

In addition, the network interface unit 135 is connected to, for example, an Internet Protocol TV (IPTV) so as to receive and transmit an image, audio or data signal processed by a set-top box for IPTV to the controller 170 and to transmit signals processed by the controller 170 to the set-top box for IPTV, in order to perform bidirectional communication.

The IPTV may include ADSL-TV, VDSL-TV, FFTH-TV or the like according to the type of transmission network or include TV over DSL, Video over DSL, TV over IP (TVIP), Broadband TV (BTV), or the like. In addition, the IPTV may include an Internet TV capable of Internet access or a full-browsing TV.

The memory 140 may store a program for performing signal processing and control in the controller 170 and store a processed image, audio or data signal.

In addition, the memory 140 may perform a function for temporarily storing an image, audio or data signal input through the external device interface unit 130. In addition, the memory 140 may store information about predetermined broadcast channels through a channel storage function such as a channel map.

The memory 140 may include at least one of a flash memory type storage medium, a hard disk type storage medium, a multimedia card micro type medium, a card type memory (e.g., SD memory, XD memory, or the like), a RAM, or a ROM (EEPROM or the like). The image display device 100 may reproduce and provide a file (a moving image file, a still image file, a music file, a document file, or the like) stored in the memory 140 to the user.

Although FIG. 1 shows an embodiment in which the memory 140 is included separately from the controller 170, the present invention is not limited thereto. The memory 140 may be included in the controller 170.

The user input interface unit 150 sends a signal input by the user to the controller 170 or sends a signal from the controller to the user.

For example, the user input interface unit 150 may receive a user input signal, such as power on/off, channel selection or screen setup, from a remote control device 200 or transmit a signal from the controller 170 to the remote control device 200, according to various communication systems such as a Radio Frequency (RF) communication system or an Infrared (IR) communication system.

In addition, for example, the user input interface unit 150 may send a user input signal input through a local key (not shown) such as a power key, a channel key, a volume key, or a setup value to the controller 170.

In addition, for example, the user input interface unit 150 may send a user input signal received from a sensing unit (not shown) for sensing the gesture of the user to the controller 170 or transmit a signal from the controller 170 to the sensing unit (not shown). The sensing unit (not shown) may include a touch sensor, a voice sensor, a position sensor, a motion sensor, or the like.

The controller 170 may demultiplex the TS signal input through the tuner 110, the demodulator 120 or the external device interface unit 130 or process the demultiplexed signals, and generate and output signals for an image or audio output.

The image signal processed by the controller 170 may be input to the display 180 such that an image corresponding to the image signal is displayed. The image signal processed by the controller 170 may be input to an external output device through the external device interface unit 130.

The audio signal processed by the controller 170 may be audibly output through the audio output unit 185. In addition, the audio signal processed by the controller 170 may be input to an external output device through the external device interface unit 130.

Although not shown in FIG. 1, the controller 170 may include a demultiplexer, an image processing unit, and the like. These will be described in detail with reference to FIG. 4.

The controller 170 may control the overall operation of the image display device 100. For example, the controller 170 may control the tuner 110 so as to tune to an RF broadcast corresponding to a channel selected by the user or a channel stored in advance.

In addition, the controller 170 may control the image display device 100 according to a user command input through the user input interface unit 150 or an internal program.

For example, the controller 170 controls the tuner 110 such that the signal of a channel selected according to a predetermined channel selection command received through the user input interface unit 150 is input. The image, audio or data signal of the selected channel is processed. The controller 170 may control information about the channel selected by the user to be output through the display 180 or the audio output unit 185 together with the image or audio signal.

As another example, the controller 170 may control an image or audio signal received from an external device, for example, a camera or a camcorder, through the external device interface unit 130 to be output through the display 180 or the audio output unit 185, according to an external device image reproduction command received through the user input interface unit 150.

The controller 170 may control the display 180 to display an image. For example, the controller may control a broadcast image input through the tuner 110, an external input image input through the external device interface unit 130, an image input through a network interface unit 135, or an image stored in the memory 140 to be displayed on the display 180.

At this time, the image displayed on the display 180 may be a still image, a moving image, a 2D image or a 3D image.

The controller 170 generates and displays a predetermined object in the image displayed on the display 180 as a 3D object. For example, the object may be at least one of a connected web screen (newspaper, magazine, or the like), an Electronic Program Guide (EPG), various menus, a widget, an icon, a still image, a moving image, or a text.

Such a 3D object may have a sense of depth different from that of the image displayed on the display 180. Preferably, the 3D object may be processed such that the 3D object appears to be located in front of the image displayed on the display 180.

The controller 170 recognizes a user's position based on an image photographed using a photographing unit (not shown). The controller can obtain, for example, a distance (z-axis coordinate) between the user and the image display device 100. In addition, the controller can obtain an X-axis coordinate and a y-axis coordinate in the image display device corresponding to the user's position.

Although not shown in the drawing, a channel browsing processing unit for generating a thumbnail image corresponding to a channel signal or an external input signal may be further included. The channel browsing processing unit may receive a Transport Stream (TS) signal output from the demodulator 120 or a TS signal output from the external device interface unit 130, extract an image from the received TS signal, and generate a thumbnail image. The generated thumbnail image may be input to the controller 170 without conversion or in a state of being coded. In addition, the generated thumbnail image may be input to the controller 170 in a state of being coded into a stream format. The controller 170 may display a thumbnail list including a plurality of thumbnail images on the display 180 using the received thumbnail images. The thumbnail list may be displayed in a brief viewing manner in which the thumbnail list is displayed in a portion of the display 180 in a state in which in a predetermined image is displayed, or in a full viewing manner in which the thumbnail list is displayed over the entirety of the display 180.

The display 180 converts an image signal, a data signal, an OSD signal or a control signal processed by the controller 170 or an image signal, data signal or a control signal received through the external device interface unit 130 and generates a driving signal.

The display 180 may include a Plasma Display Panel (PDP), a Liquid Crystal Display (LCD), an Organic Light Emitting Diode (OLED) display, and a flexible display. In particular, in the embodiment of the present invention, a 3D display is preferable.

For 3D image viewing, the display 180 may be divided into a supplementary display type and a single display type.

In the single display type, a 3D image is implemented on the display 180 without a separate subsidiary device, e.g., glasses. Examples of the single display type may include various types such as a lenticular type and a parallax barrier type.

In the supplementary display type, a 3D image is implemented using a subsidiary device, in addition to the display 180. Examples of the supplementary display type include various types such as a Head-Mounted Display (HMD) type and a glasses type. The glasses type may be divided into a passive type such as a polarized glasses type and an active type such as a shutter glasses type. The HMD type may be divided into a passive type and an active type.

In the embodiment of the present invention, for 3D image viewing, the 3D supplementary display 195 is included. It is assumed that the 3D supplementary display 195 is an active type supplementary display. Hereinafter, the case of using the shutter glasses will be described.

The display 180 may include a touch screen and function as an input device as well as an output device.

The audio output unit 185 receives the audio signal processed by the controller 170, for example, a stereo signal, a 3.1 channel signal or a 5.1 channel signal, and outputs audio. The audio output unit 185 may be implemented by various types of speakers.

In order to sense the gesture of the user, as described above, the sensing unit (not shown) including at least one of touch sensor, a voice sensor, a position sensor, a motion sensor, or the like may be further included in the image display device 100. The signal sensed by the sensing unit (not shown) is sent to the controller 170 through the user input interface unit 150.

The controller 170 may sense the gesture of the user by the image photographed using the photographing unit (not shown), the signal sensed using the sensing unit (not shown) or a combination thereof.

The power supply unit 190 supplies power to the image display device 100. In particular, the power supply unit may supply power to the controller 170 implemented in the form of a System On Chip (SOC), the display 180 for displaying an image, and the audio output unit 185 for outputting audio.

The remote control device 100 transmits a user input signal to the user input interface unit 150. The remote control device 200 may use Bluetooth, Radio Frequency Identification (RFID) communication, IR communication, Ultra Wideband (UWB), or ZigBee. The remote control device 200 may receive the image, audio or data signal output from the user input interface unit 150 and display or audibly output the signal.

The image display device 100 may be a fixed digital broadcast receiver capable of receiving at least one of an ATSC (8-VSB) digital broadcast, a DVB-T (COFDM) digital broadcast or an ISDB-T (BST-OFDM) digital broadcast, or a mobile digital broadcast receiver capable of receiving at least one of a terrestrial DMB digital broadcast, a satellite DMB digital broadcast, an ATSC-M/H digital broadcast, a DVB-H (COFDM) digital broadcast or a Media Forward Link Only digital broadcast. In addition, the image display device 100 may be a cable, satellite or IPTV digital broadcast receiver.

The image display device described in the present specification may include a TV receiver, a mobile phone, a smart phone, a notebook computer, a digital broadcast terminal, a Personal Digital Assistants (PDA), a Portable Multimedia Player (PMP), or the like.

FIG. 1 is a block diagram of the image display device 100 according to one embodiment of the present invention. The components of the block diagram may be combined, added or omitted according to the type of the image display device 100. That is, two or more components may be combined into one component or one component may be divided into two or more components, as necessary. The functions of the blocks are intended to describe, and is not intended to limit the scope of the present invention.

Hereinafter, it is assumed that the image display device 100 according to the embodiment of the present invention includes an LCD display which implements a 3D display and requires a separate backlight unit.

Figure 2:
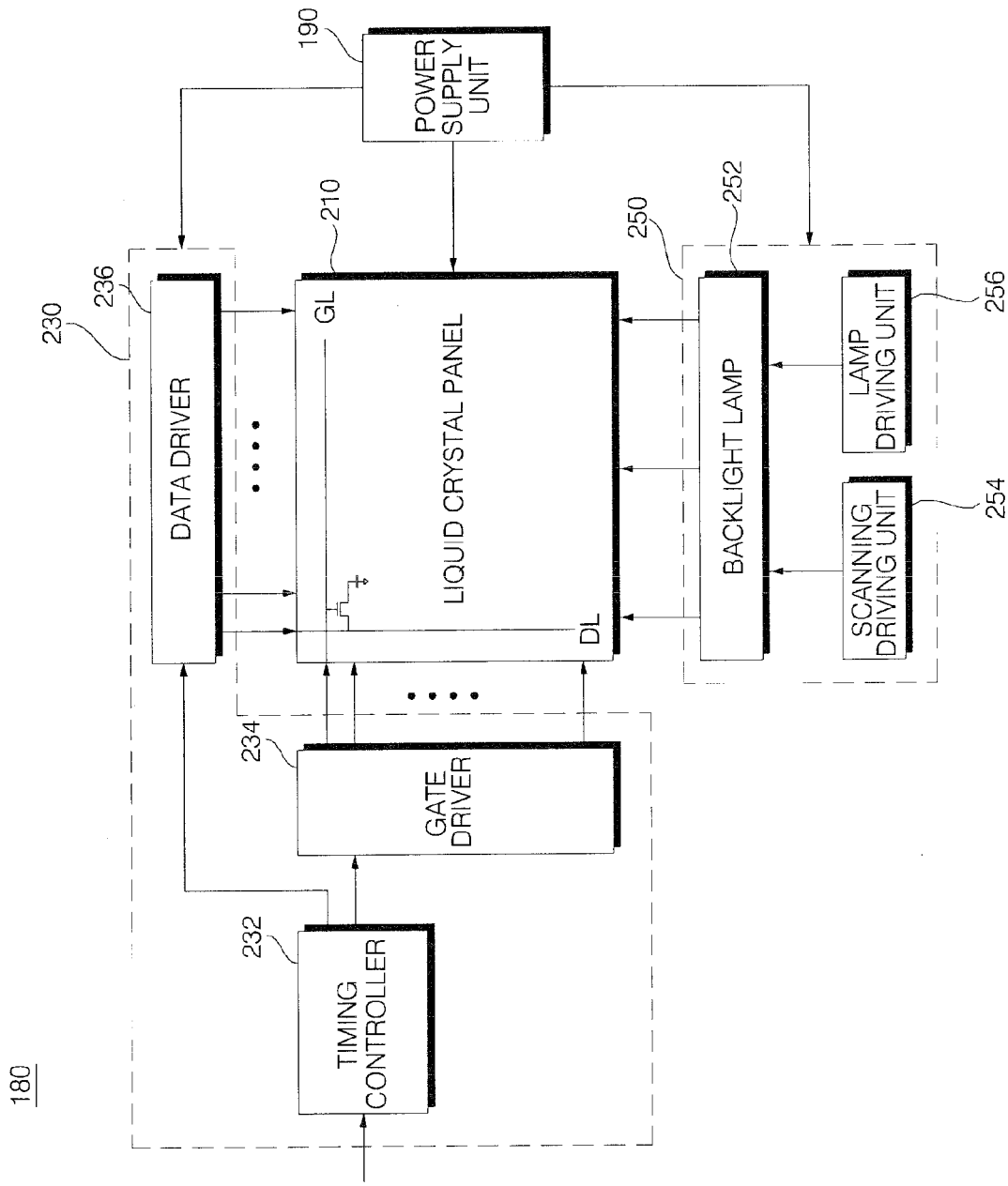
FIG. 2 is a block diagram showing an example of a power supply unit and a display of FIG. 1.

FIG. 2 is a block diagram showing an example of the power supply unit and the display of FIG. 1.

Referring to FIG. 2, the LCD display 180 includes a liquid crystal panel 210, a driving unit 230 and a backlight unit 250.

The liquid crystal panel 210 includes a first substrate on which a plurality of gate lines GL and data lines DL are arranged in a matrix so as to intersect each other and thin film transistors and pixel electrodes connected thereto are formed at intersections of the lines, a second substrate including a common electrode, and a liquid crystal layer formed between the first substrate and the second substrate, in order to display an image.

The driving unit 230 drives the liquid crystal panel 210 using a control signal and a data signal supplied from the controller 170 of FIG. 1. The driving unit 230 includes a timing controller 232, a gate driver 234 and a data driver 236.

The timing controller 232 receives a control signal, RGB data signals, a vertical synchronization signal Vsync and the like from the controller 170, controls the gate driver 234 and the data driver 236 according to the control signal, rearranges RGB data signals, and supplies the RGB data signals to the data driver 236.

A scanning signal and an image signal are supplied to the liquid crystal panel 210 through the gate lines GL and the data lines DL, under the control of the gate driver 234, the data driver 236 and the timing controller 232.

The backlight unit 250 supplies light to the liquid crystal panel 210. The backlight unit 250 may include a plurality of backlight lamps 252 functioning as a light source, a scanning driving unit 254 for controlling scanning drive of the backlight lamps 252, and a lamp driving unit 256 for turning the backlight lamps 252 on/off.

A predetermined image is displayed using the light emitted from the backlight unit 250, in a state in which light transmission of the liquid crystal layer is adjusted by an electric field formed between the pixel electrodes and the common electrode of the liquid crystal panel 210.

The power supply unit 190 may supply a common electrode voltage Vcom to the liquid crystal panel 210 and supply a gamma voltage to the data driver 236. In addition, the power supply unit 190 supplies driving power to drive the backlight lamps 252.

Figure 3:
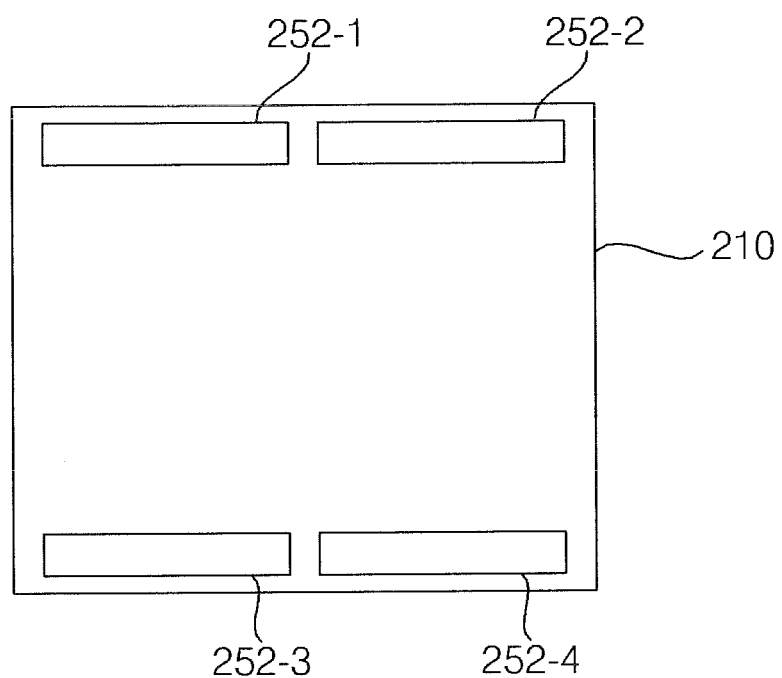
FIG. 3 is a diagram showing arrangement of backlight lamps of FIG. 2.

FIG. 3 is a diagram showing the arrangement of backlight lamps of FIG. 2.

First, referring to the drawing, the image display device 100 according to the embodiment of the present invention may include the display 180 including the liquid crystal panel 210 and the plurality of backlight lamps 252-1, 252-2, . . . , and 252-4. The plurality of backlight lamps 252-1, 252-2, . . . , and 252-4 may be Light Emitting Diode (LED) type backlight lamps.

The plurality of backlight lamps 252-1, 252-2, . . . , and 252-4 may be arranged on the rear surface of the liquid crystal panel 210 and, more particularly, on upper and lower sides of the liquid crystal panel 210. If the plurality of backlight lamps 252-1, 252-2, . . . , and 252-4 are turned on, the light is irradiated onto the entire surface of the liquid crystal panel 210 by a diffusion plate for diffusing the light from the lamps, a reflection plate for reflecting light, an optical sheet for polarizing, emitting or diffusing light, or the like. This display device is called en edge type display device.

The backlight lamps 252-1 and 252-2 arranged on the upper side of the liquid crystal panel 210 and the backlight lamps 252-3 and 252-4 arranged on the lower side of the liquid crystal panel 210 may be sequentially turned on at different times or may be turned on so as to at least partially overlap each other.

Alternatively, the backlight lamps may be arranged on any one of the upper and lower sides of the liquid crystal panel 210, the number of backlight lamps arranged on the upper side and the lower side of the liquid crystal panel 210 may be changed, and the backlight lamps arranged on the upper side and the lower side of the liquid crystal panel may have a linear shape.

Figure 4:
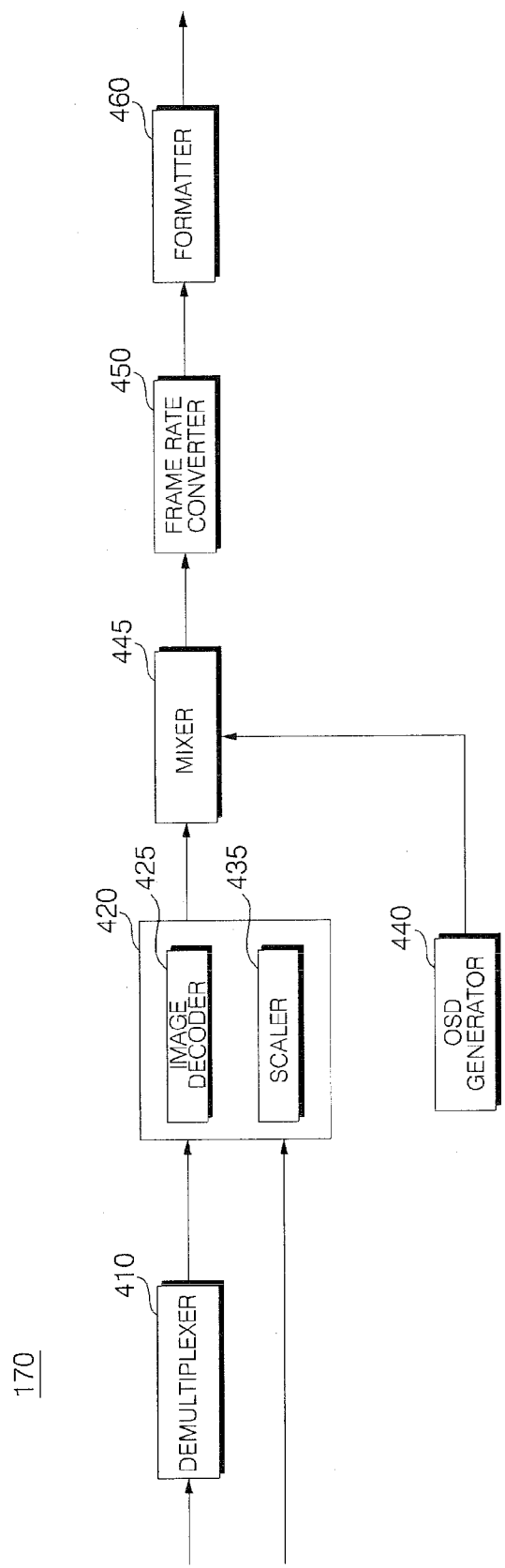
FIG. 4 is a block diagram showing a controller of FIG. 1.

FIG. 4 is a block diagram showing the controller of FIG. 1, FIG. 5 is a diagram showing various formats of a 3D image, and FIG. 6 is a diagram showing an operation of shutter glasses according to a frame sequential format of FIG. 5.

Referring to the drawings, the controller 170 according to one embodiment of the present invention may include a demultiplexer 410, an image processing unit 420, an OSD generator 440, a mixer 445, a Frame Rate Converter (FRC) 450, and a formatter 460. In addition, an audio processing unit (not shown) and a data processing unit (not shown) may be further included.

The demultiplexer 410 demultiplexes an input TS signal. For example, if an MPEG-2 TS signal is input, the demultiplexer may demultiplex and separate the MPEG-2 TS signal into image, audio and data signals. The TS signal input to the demultiplexer 410 may be a TS signal output from the tuner 110, the demodulator 120 or the external device interface unit 130.

The image processing unit 420 may process the demultiplexed image signal. The image processing unit 420 may include an image decoder 425 and a scaler 435.

The image decoder 425 decodes the demultiplexed image signal and the scaler 435 adjusts the resolution of the decoded image signal such that the image signal can be output through the display 180.

The image decoder 425 may include various types of decoders.

For example, if the demultiplexed image signal is a 2D image signal encoded based on the MPEG-2 standard, the image signal may be decoded by an MPEG-2 decoder.

In addition, for example, if the demultiplexed 2D image signal is an image signal encoded based on the H.264 standard according to a Digital Multimedia Broadcasting (DMB) or DVB-H system, a depth image signal of MPEG-C part 3, a multi-view image signal according to Multi-view Video Coding (MVC) or a free-viewpoint image signal according to Free-viewpoint TV (FTV), the image signal may be decoded by a H.264 decoder, an MPEG-C decoder, an MVC decoder or an FTV decoder.

The image signal decoded by the image processing unit 420 may include a 2D image signal, a mixture of a 2D image signal and a 3D image signal, a 3D image signal.

The image processing unit 420 may detect whether the demultiplexed image signal is a 2D image signal or a 3D image signal. The 3D image signal may be detected based on a broadcast signal received from the tuner 110, an external input signal from an external device, or an external input signal received over a network. In particular, the 3D image signal may be detected by referring to a 3D image flag in a stream header indicating 3D image, 3D image metadata, or format information of 3D image.

The image signal decoded by the image processing unit 420 may include 3D image signals in various formats. For example, the decoded image signal may be a 3D image signal including a color difference image and a depth image, or a 3D image signal including multi-view image signals. The multi-view image signals may include, for example, a left-eye image signal and a right-eye image signal.

As shown in FIG. 5, the format of the 3D image signal may include a side-by-side format (FIG. 5(a)) in which the left-eye image L and the right-eye image R are arranged in a horizontal direction, a top/down format in which the left-eye image and the right-eye image are arranged in a vertical direction, frame sequential format (FIG. 5(c)) in which the left-eye image and the right-eye image are time-divisionally arranged, an interlaced format (FIG. 5(d)) in which the left-eye image and the right-eye image are mixed in line units, and a checker box format (FIG. 5(e)) in which the left-eye image and the right-eye image are mixed in box units.

The OSD generator 440 generates an OSD signal according to a user input signal or automatically. For example, based on a user input signal, a signal for displaying a variety of information on the screen of the display 180 using graphics or text may be generated. The generated OSD signal may include a variety of data such as a user interface screen, various menu screens, a widget or an icon of the image display device 100. The generated OSD signal may include a 2D object or a 3D object.

The mixer 445 may mix the OSD signal generated by the OSD generator 440 with the image signal decoded by the image processing unit 420. At this time, the OSD signal and the decoded image signal may include at least one of a 2D signal and a 3D signal. The mixed image signal is provided to the FRC 450.

The FRC 450 converts the frame rate of the input image. For example, a frame rate of 60 Hz is converted into 120 Hz or 240 Hz or 480 Hz. If the frame rate of 60 Hz is converted into 120 Hz, a first frame may be inserted between the first frame and a second frame or a third frame estimated from the first frame and the second frame may be inserted between the first frame and the second frame. If the frame rate of 60 Hz is converted into 240 Hz, the same three frames may be inserted or three estimated frames may be inserted.

The formatter 460 may receive the signal mixed by the mixer 445, that is, the OSD signal and the decoded image signal, and separate a 2D image signal and a 3D image signal.

In the present specification, the 3D image signal includes a 3D object. Examples of such an object may include a Picture In Picture (PIP) image (still image or moving image), an EPG indicating broadcast program information, various menus, a widget, an icon, a text, an object, a person or a background in an image, or a web screen (newspaper, magazine, or the like).

The formatter 460 may change the format of the 3D image signal to, for example, any one of various formats shown in FIG. 5. In particular, in the embodiment of the present invention, it is assumed that the format is changed to the frame sequential format among the formats shown in FIG. 5. That is, the left-eye image signal L and the right-eye image signal R are sequentially and alternately aligned. The 3D supplementary display 195 of FIG. 1 preferably uses shutter glasses.

FIG. 6 shows an operation relationship between the shutter glasses 195 and the frame sequential format. FIG. 6(a) shows the case where the left-eye glass of the shutter glasses 195 is opened and the right-eye glass of the shutter glasses is closed when the left-eye image L is displayed on the display 180 and FIG. 6(b) shows the case where the left-eye glass of the shutter glasses 195 is closed and the right-eye glass of the shutter glasses is opened.

The formatter 460 may switch a 2D image signal to a 3D image signal. For example, according to a 3D image generation algorithm, an edge or a selectable object may be detected from a 2D image signal, and an object according to the detected edge or the selectable object may be separated to generate a 3D image signal. The generated 3D image signal may be separated into a left-eye image signal L and a right-eye image signal R, as described above.

The audio processing unit (not shown) in the controller 170 may process the demultiplexed audio signal. The audio processing unit (not shown) may include various decoders.

For example, if the demultiplexed audio signal is a coded audio signal, the coded audio signal may be decoded. In detail, if the demultiplexed audio signal is an audio signal coded based on the MPEG-2 standard, the audio signal may be decoded by an MPEG-2 decoder. If the demultiplexed audio signal is an audio signal coded based on the MPEG 4 Bit Sliced Arithmetic Coding (BSAC) standard according to a terrestrial DMB system, the audio signal may be decoded by an MPEG 4 decoder. If the demultiplexed audio signal is an audio signal coded based on the MPEG-2 Advanced Audio Codec (AAC) standard according to the satellite DMB or DVB-H system, the audio signal may be decoded by an AAC decoder. If the demultiplexed audio signal is an audio signal coded based on the Dolby AC-3 standard, the audio signal may be decoded by an AC-3 decoder.

The audio processing unit (not shown) in the controller 170 may process base, treble, volume adjustment or the like.

The data processing unit (not shown) in the controller 170 may process the demultiplexed data signal. For example, if the demultiplexed data signal is coded data signal, the coded data signal may be decoded. The coded data signal may be EPG information including broadcast information such as a start time and an end time of a broadcast program broadcasted on each channel. For example, the EPG information may include ATSC-Program and System Information Protocol (ATSC-PSIP) information in the ATSC system and include DVB-Service Information (DVB-SI) in the DVB system. The ATSC-PSIP information and the DVB-SI may be included in the above-described TS, that is, the header (4 bytes) of the MPEG-2 TS.

Although, in FIG. 4, the signals from the OSD generator 440 and the image processing unit 420 are mixed by the mixer 445 and are subjected to 3D processing by the formatter 460, the present invention is not limited thereto and the mixer may be located at a next stage of the formatter. That is, the formatter 460 may perform 3D processing with respect to the output of the image processing unit 420, the OSD generator 440 may generate an OSD signal and performs 3D processing with respect to the OSD signal, and the mixer 445 may mix the processed 3D signals.

FIG. 4 is the block diagram of the controller 170 according to the embodiment of the present invention. The components of the block diagram may be combined, added or omitted according to the types of the controller 170.

In particular, the FRC 450 and the formatter 460 may not be included in the controller 170 and may be included separately from the controller.

Figure 7:
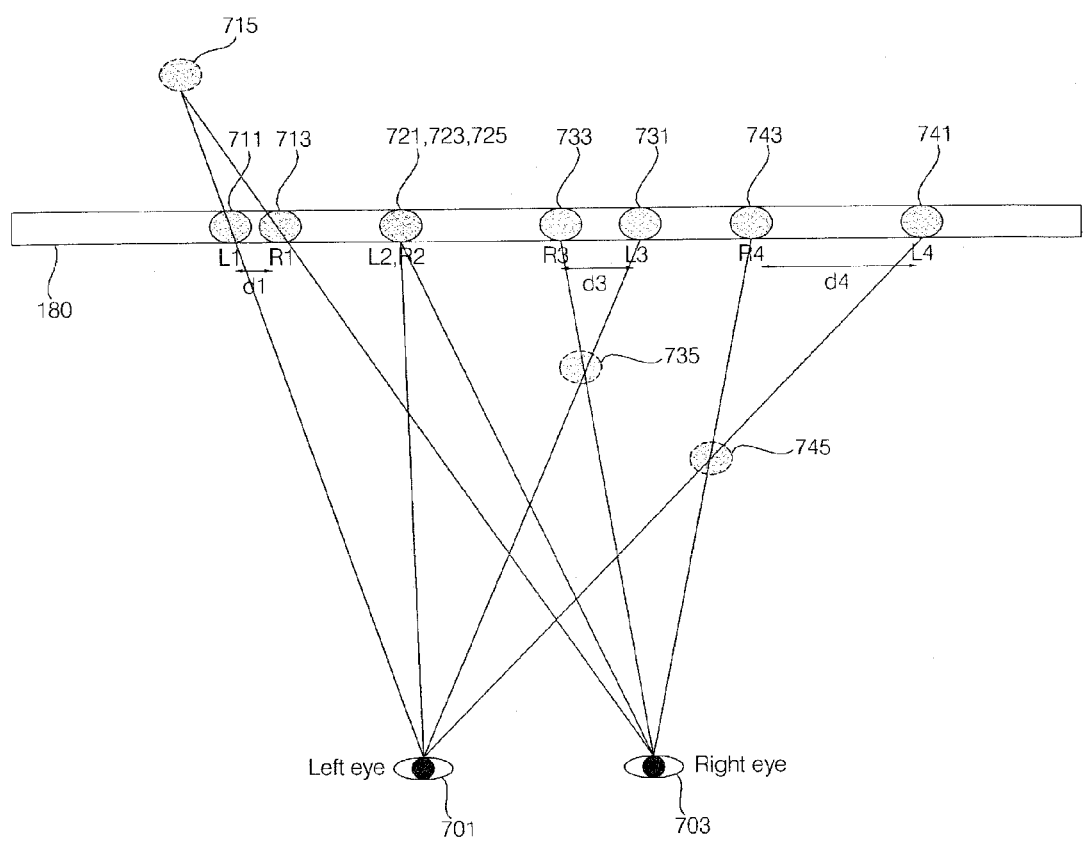
FIG. 7 is a diagram illustrating a state in which an image is formed by a left-eye image and a right-eye image.

FIG. 7 is a diagram illustrating a state in which an image is formed by a left-eye image and a right-eye image, and FIG. 8 is a diagram illustrating the depth of a 3D image according to a distance between a left-eye image and a right-eye image.

First, a plurality of images or a plurality of objects 715, 725, 735 and 745 is shown in FIG. 7.

First, the first object 715 includes a first left-eye image 711 (L) based on a first left-eye image signal and a first right-eye image 713 (R) based on a first right-eye image signal. A distance between the first right-eye image 713 and the first left-eye image 711 on the display 180 is set to d1. At this time, the user sees an image that appears to be formed at an intersection of a line connecting the left eye 701 and the first left-eye image 711 and a line connecting the right eye 703 and the first right-eye image 713. Accordingly, the user sees the first object 715 that appears to be located in back of the display unit 180.

Next, the second object 725 includes a second left-eye image 721 (L) and a second right-eye image 723 (R). Since the second left-eye image 721 and the second right-eye image 723 are displayed so as to overlap each other on the display unit 180, a distance therebetween is set to 0. Accordingly, the user sees the second object 725 that appears to be located on the display 180.

Next, the third object 735 includes a third left-eye image 731 (L) and a third right-eye image 733 (R), and the fourth object 745 includes a fourth left-eye image 741 (L) and a fourth right-eye image 743 (R). The distance between the third left-eye image 731 and the third right-eye image 733 is set to d3, and the distance between the fourth left-eye image 741 and the fourth right-eye image 743 is set to d4.

According to the above-described method, the user sees the third objects 735 and the fourth object 745 that appear to be located at positions where images are formed, sees the third objects 735 and the fourth object 745 that appear to be located in front of the display 180, in the drawing.

At this time, the user sees the fourth object 745 that appears to be located in front of, that is, protruded from the third object 735. The distance d4 between the fourth left-eye image 741 (L) and the fourth right-eye image 743 (R) is greater than the distance d3 between the third left-eye image 731 (L) and the third right-eye image 733 (R).

In the embodiment of the present invention, the distance between the display 180 and each of the objects 715, 725, 735 and 745, which is recognized by the user, is expressed by a depth. The depth of the object that appears to the user to be located in back of the display 180 has a negative value (−) and the depth of the object that appears to the user to be located in front of the display 180 has a positive value (+). That is, the depth value is gradually increased as a degree of protrusion of the object from the display toward the user is increased.

Referring to FIG. 8, it can be seen that, if a distance a between a left-eye image 801 and a right-eye image 802 shown in FIG. 8(a)) is less than a distance b between a left-eye image 801 and a right-eye image 802 shown in FIG. 8(b), the depth a' of the 3D object of FIG. 8(a) is less than the depth b' of the 3D object of FIG. 8(b).

If the 3D image includes the left-eye image and the right-eye image, a position of an image that appears to the user to be formed is changed according to the distance between the left-eye image and the right-eye image. Accordingly, by adjusting the display distance between the left-eye image and the right-eye image, it is possible to adjust the depth of the 3D image or the 3D object including the left-eye image and the right-eye image.

Figure 9:
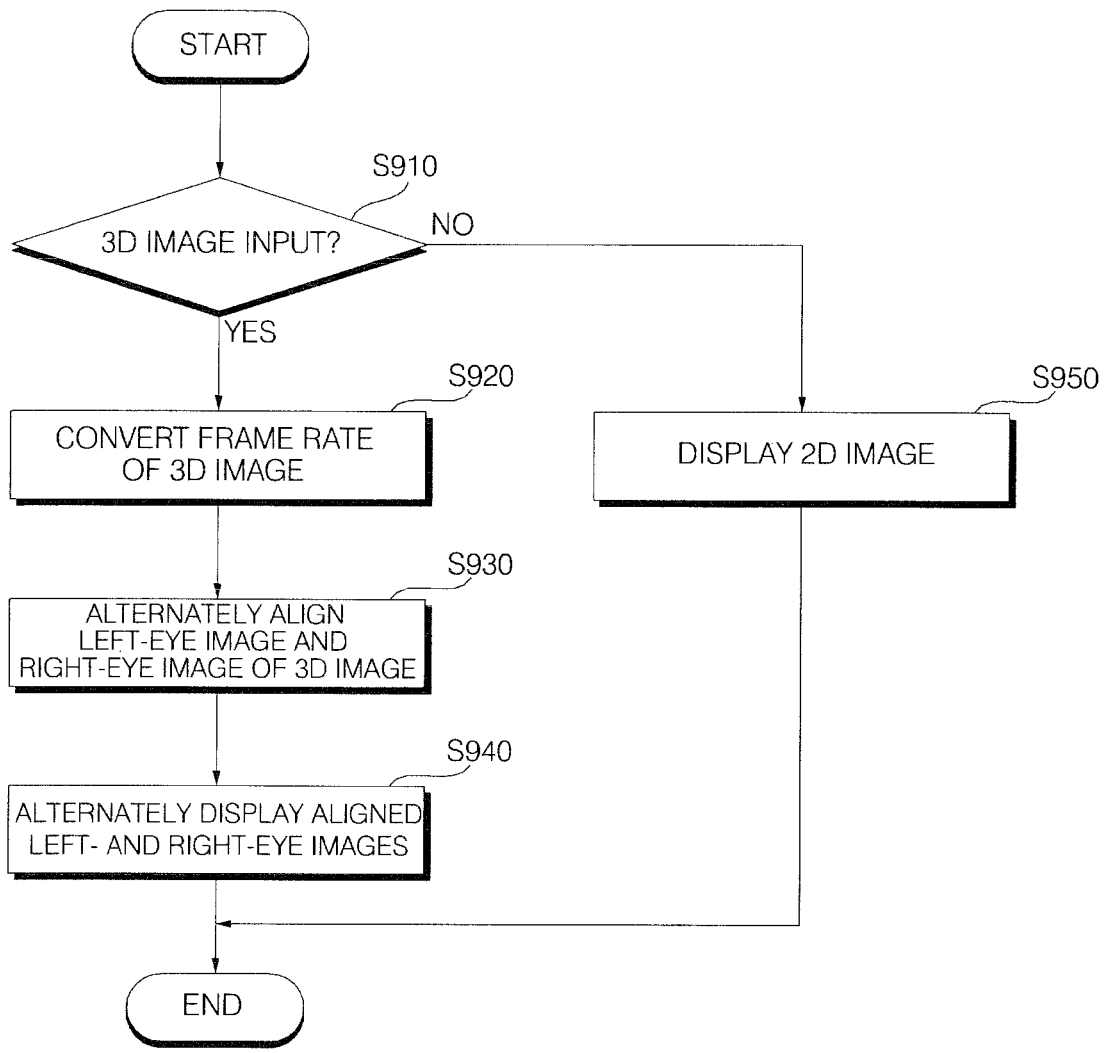
FIG. 9 is a flowchart illustrating a method for operating an image display device according to an embodiment of the present invention.
Figure 10:
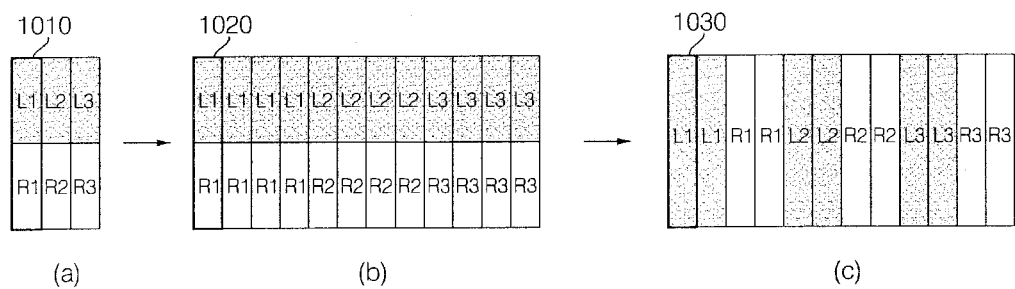

FIG. 9 is a flowchart illustrating a method for operating an image display device according to an embodiment of the present invention, and FIGS. 10 to 20 are diagrams illustrating various examples of the method for operating the image display device of FIG. 9.

Referring to FIG. 9, first, a determination as to whether or not a 3D image is input is made (S910). The 3D image input to the image display device 100 may be a broadcast image from a broadcast signal received through the tuner 110, an external input image from an external device, an image stored in the memory 140, or an image received from a content provider over a network.

The input image may be demodulated by the demodulator 120 so as to be processed by the controller 170, or may be directly input to the controller 170. As described above, the controller 170 performs demultiplexing, decoding, or the like.

The controller 170 determines whether or not the input image is a 3D image signal, by referring to a 3D image flag in a stream header indicating a 3D image, 3D image metadata, or format information of a 3D image.

If the input image is not a 3D image, that is, is a 2D image, step S950 is immediately performed. Then, the 2D image signal processed by the controller 170 is converted into RGB data signals and the RGB data signals are input to the display 180. The display 180 receives the RGB data signals and displays a 2D image.

If the input image is a 3D image, the controller 170 processes the 3D image.

FIG. 10(a) shows image frames of the 3D image processed by the image processing unit 420. At this time, the format of a 3D image frame 1010 is a top/down format (see FIG. 5(b)).

Next, the frame rate of the 3D image is converted (S920). The FRC 450 converts the frame rate of the 3D image. For example, the frame rate of 60 Hz is converted to 120 Hz, 240 Hz or 480 Hz.

FIG. 10(b) shows the frame rate of the 3D image increased by the FRC 450. The FRC 450 repeatedly inserts a 3D image frame 1020 so as to increase the frame rate. At this time, the format of the 3D image is the top/down format, without change.

Although, in FIG. 10(b), the frame rate is quadrupled, the present invention is not limited thereto and the frame rate may be variously increased. That is, the frame rate may be doubled.

Next, the left-eye image and the right-eye image of the 3D image are alternately aligned (S930). The formatter 460 alternately aligns the left-eye image and the right-eye image of the 3D image. That is, the format of the 3D image is converted into the frame sequential format shown in FIG. 5(c).

FIG. 10(c) shows the conversion of the format of the 3D image frame, the frame rate of which is converted by the FRC 450, into the frame sequential format by the formatter 460.

In FIG. 10(c), a first left-eye image frame L1 (1030), a first left-eye image frame L1, a first right-eye image frame R1, a first right-eye image frame R1, a second left-eye image frame L2, and the like are sequentially arranged. That is, the same left-eye image frames are consecutively arranged and the same right-eye image frames are consecutively arranged.

Although not shown in the drawing, a first left-eye image frame L1, a black frame B, a first right-eye image frame R1, a black frame B, a second left-eye image frame L2 and the like may be sequentially arranged.

If the left-eye image frame and the right-eye image frame are alternately arranged by the formatter 460, the frames are input to the display 180.

FIG. 11 is a diagram showing the case where the frames arranged by the formatter 460 are displayed on the liquid crystal panel 210 in the display 180. FIG. 11(a) shows the actual display of the frames arranged as shown in FIG. 10(c), and FIG. 11(b) shows liquid crystal response characteristics of the liquid crystal panel 210 when the frames are actually displayed as shown in FIG. 11(a). FIG. 11(c) shows the driving timing of the backlight lamps 252 when the conventional method for displaying a 3D image is used.

The horizontal axis of FIG. 11(a) denotes a time, and the vertical axis thereof denotes a vertical length of the panel.

Since the liquid crystal panel 210 has a response speed of liquid crystal and hold type display characteristics as shown in FIG. 11(b), if the backlight lamps 252 are continuously turned on as shown in FIG. 11(c), a difference between the display times of an upper side and a lower side of the liquid crystal panel 210 is large and thus crosstalk is generated. In the embodiment of the present invention, a method for reducing crosstalk generated when the 3D image is displayed in the frame sequential format is proposed.

Next, the left-eye image and the right-eye image of the 3D image are alternately displayed (S940).

The display 180 receives the RGB data signals for the left-eye image and the RGB data signals for the right-eye image alternately arranged by the formatter 460, and alternately displays the left-eye image and the right-eye image.

In particular, the display 180 turns the backlight lamps 252-1 and 252-2 arranged on the upper side of the liquid crystal panel 210 and the backlight lamps 252-252-4 arranged on the lower side of the liquid crystal panel 210 on, during a portion of a display period of the left-eye image or the right-eye image, thereby displaying the 3D image.

Figure 12:
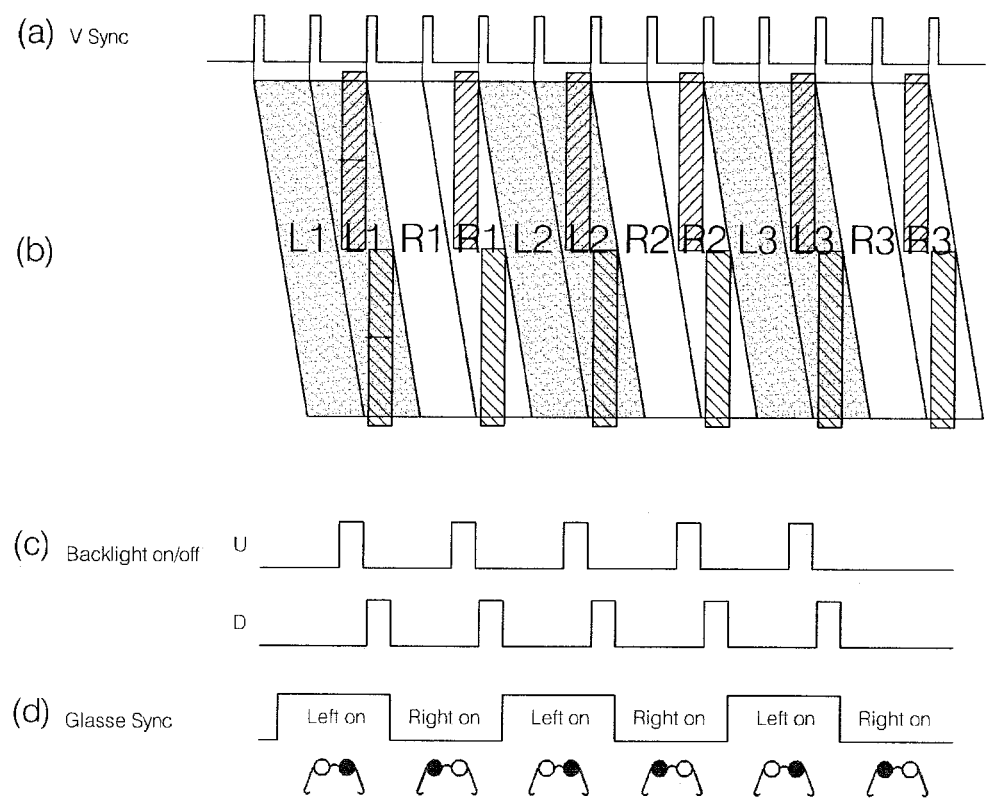

Referring to FIG. 12, the backlight lamps 252 are turned on in synchronization with the left-eye image frame in a state in which the left-eye image frame and the right-eye image frame are aligned by the formatter 460.

FIG. 12(a) shows a vertical synchronization frequency Vsync indicating a display timing of each frame, and FIG. 12(b) shows the case where the backlight lamps 252 are turned on in synchronization with the left-eye image frame and the right-eye image frame in a state in which each frame is input to the liquid crystal panel 210.

FIG. 12(b) shows the state in which the backlight lamps 252-1 and 252-2 arranged on the upper side of the liquid crystal panel 210 and the backlight lamps 252-3 and 252-4 arranged on the lower side of the liquid crystal panel 210 are turned on during the portion of the display period of the consecutively arranged left-eye image frames or the consecutively arranged right-eye image frames. By such driving, crosstalk, in which adjacent images (the left-eye image and the right-eye image) overlap each other when the 3D image is displayed, is reduced.

FIG. 12(b) shows the state in which the backlight lamps 252-1 and 252-2 arranged on the upper side of the panel are first turned on and the backlight lamps 252-3 and 252-4 arranged on the lower side of the panel are subsequently turned on.

Referring to the drawing, the light is transmitted from the upper side to the central portion of the panel when the backlight lamps 252-1 and 252-2 arranged on the upper side of the panel are turned on and the light is transmitted from the lower side to the central portion of the panel when the backlight lamps 252-3 and 252-4 arranged on the lower side of the panel are turned on.

By differentiating the driving timings of the backlight lamps arranged on the upper and lower sides of the liquid crystal panel 210, it is possible to reduce power consumption when the backlight lamps are driven. Alternatively, the backlight lamps arranged on the lower side of the panel may be turned on earlier than the backlight lamps arranged on the upper side of the panel. This will be described later with reference to FIG. 16.

FIG. 12(c) shows an on/off timing of the backlight lamps 252. In the drawing, the backlight lamps 252 are turned on at a high level. The backlight lamps 252-1, 252-2, ..., and 252-4 of FIG. 12 are used in an edge type display device, and the backlight lamps 252-1 and 252-2 arranged on the upper side of the panel are turned on earlier than the backlight lamps 252-3 and 252-4 arranged on the lower side of the panel.

FIG. 12(d) shows an operation signal timing of the shutter glasses 195. According to the operation signal timing of the shutter glasses 195, only the left-eye glass is opened when the left-eye image frames L1, L2 and L3 are displayed and only the right-eye glass is opened when the right-eye image frames R1, R2 and R3 are displayed.

Figure 13:
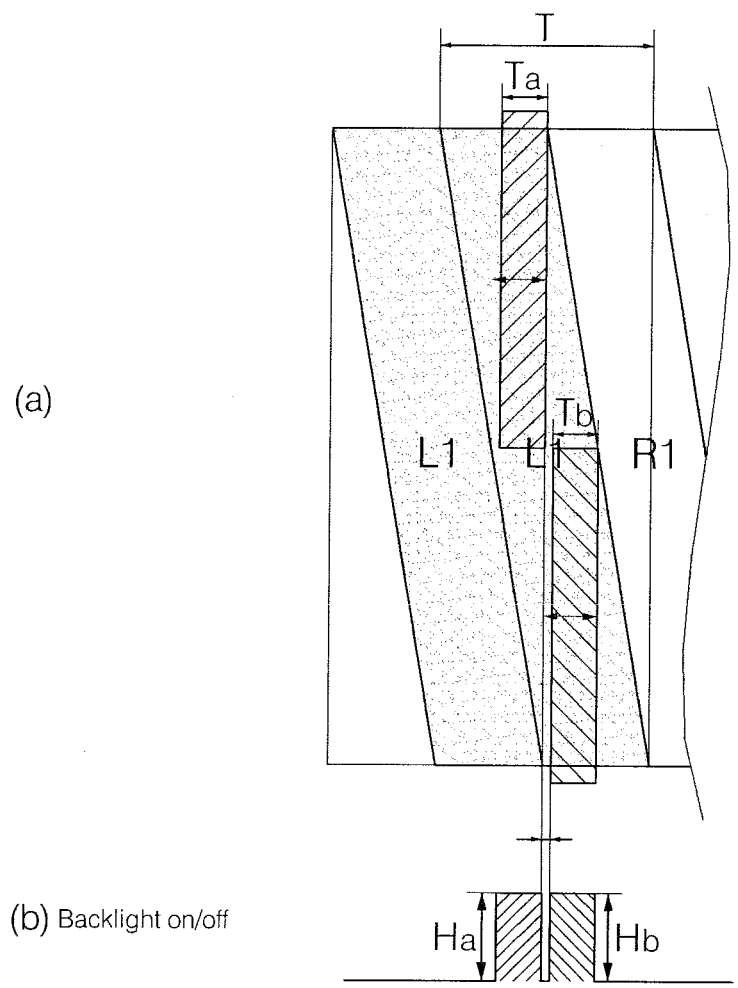

FIG. 13 is an enlarged diagram of the frame arrangement of FIG. 12.

Referring to the drawing, the frame arrangement of FIG. is characterized in that the same frames are repeatedly arranged.

That is, in the drawing, the first left-eye image frame L1, the first left-eye image frame L1, the first right-eye image frame R1, the first right-eye image frame R1, the second left-eye image frame L2 and the like are sequentially arranged.

Accordingly, the on period Ta of the backlight lamps 252-1 and 252-2 arranged on the upper side of the panel may be variously set within two repeated left-eye image frames L1 and L1, L2 and L2, and L3 and L3 or two repeated right-eye image frames R1 and R1, R2 and R2, and R3 and R3.

In addition, the on period Tb of the backlight lamps 252-3 and 252-4 arranged on the lower side of the panel may be variously set within two repeated left-eye image frames L1 and L1, L2 and L2, and L3 and L3 or two repeated right-eye image frames R1 and R1, R2 and R2, and R3 and R3.

Accordingly, the on periods Ta and Tb of the backlight lamps 252 can be changed and thus the brightness of the image can be adjusted.

In the drawing, the backlight lamps 252-1 and 252-2 arranged on the upper side of the panel and the backlight lamps 252-3 and 252-4 arranged on the lower side of the panel are turned on in a last left-eye image frame of the consecutive left-eye image frames, that is, a second left-eye image frame L1, L2 or L3. Accordingly, it is possible to prevent crosstalk, in which the adjacent images are displayed when the 3D image is displayed.

The backlight lamps 252-1 and 252-2 arranged on the upper side of the panel and the backlight lamps 252-3 and 252-4 arranged on the lower side of the panel are turned on in a last right-eye image frame of the consecutive right-eye image frames, that is, a second right-eye image frame R1, R2 or R3. Accordingly, it is possible to prevent crosstalk in which the adjacent images are displayed when the 3D image is displayed.

The current level Ha of the first turned on backlight lamps 252-1 and 252-2 arranged on the upper side of the panel and the current level Hb of the subsequently turned on backlight lamps 252-3 and 252-4 arranged on the lower side of the panel may be different from each other. Preferably, the current level Hb of the subsequently turned on backlight lamps 252-3 and 252-4 arranged on the lower side of the panel may be greater than the current level Ha of the first turned on backlight lamps 252-1 and 252-2 arranged on the upper side of the panel. Accordingly, the afterimage of an afterimage period when switching the image is reduced and thus crosstalk is reduced.

In FIG. 13, the on period Ta of the backlight lamps 252-1 and 252-2 arranged on the upper side of the panel and the on period Tb of the backlight lamps 252-3 and 252-4 arranged on the lower side of the panel are spaced apart from each other. Accordingly, it is possible to reduce instantaneous current when the backlight lamps are driven and, as a result, to reduce power consumption when the backlight lamps are driven.

Figure 14:
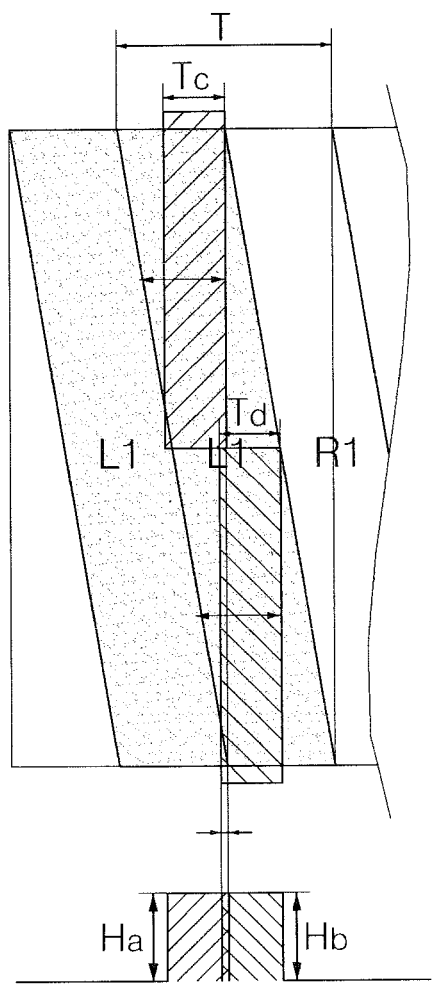

FIG. 14 is similar to FIG. 13, but is different from FIG. 13 in that a portion of the on period Tc of the backlight lamps 252-1 and 252-2 arranged on the upper side of the panel and a portion of the on period Td of the backlight lamps 252-3 and 252-4 arranged on the lower side of the panel overlap each other. Even in this case, since the on start times are different, it is possible to reduce instantaneous load when the backlight lamps are driven and, as a result, to reduce power consumption when the backlight lamps are driven.

Although, in the drawing, the portion of the on period Tc of the backlight lamps 252-1 and 252-2 arranged on the upper side of the panel and the portion of the on period Td of the backlight lamps 252-3 and 252-4 arranged on the lower side of the panel overlap each other, the present invention is not limited thereto. When the backlight lamps 252-1 and 252-2 arranged on the upper side of the panel are turned off, the backlight lamps 252-3 and 252-4 arranged on the lower side of the panel may be turned on. That is, the on period Tc and the on period Td may abut on each other.

Figure 15:
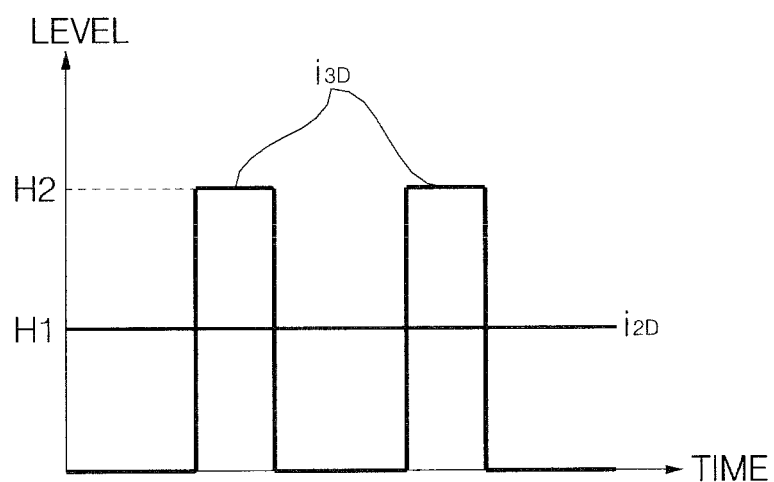

FIG. 15 is a diagram showing comparison between the current levels when a 3D image is displayed and a 2D image is displayed.

It can be seen from the drawing that current flowing in the lamp per unit frame when the 3D image is displayed is less than that when the 2D image is displayed. That is, a product of a time and a current level when the 3D image is displayed is less than that when the 2D image is displayed. This is because, as shown in FIGS. 12 to 13, the backlight lamps 252-1 and 252-2 arranged on the upper side of the panel and the backlight lamps 252-3 and 252-4 arranged on the lower side of the panel are turned on in the portion of the display period of the left-eye image frame or the right-eye image frame.

In the embodiment of the present invention, in order to prevent luminance deterioration when the 3D image is displayed, as compared with when the 2D image is displayed, the level H2 of instantaneous current $i_{3D}$ flowing in the backlight lamps 252 when the 3D image is displayed is set to be greater than the level H1 of instantaneous current $i_{2D}$ flowing in the backlight lamps 252 when the 2D image is displayed. Accordingly, it is possible to improve luminance when the 3D image is displayed.

Figure 16:
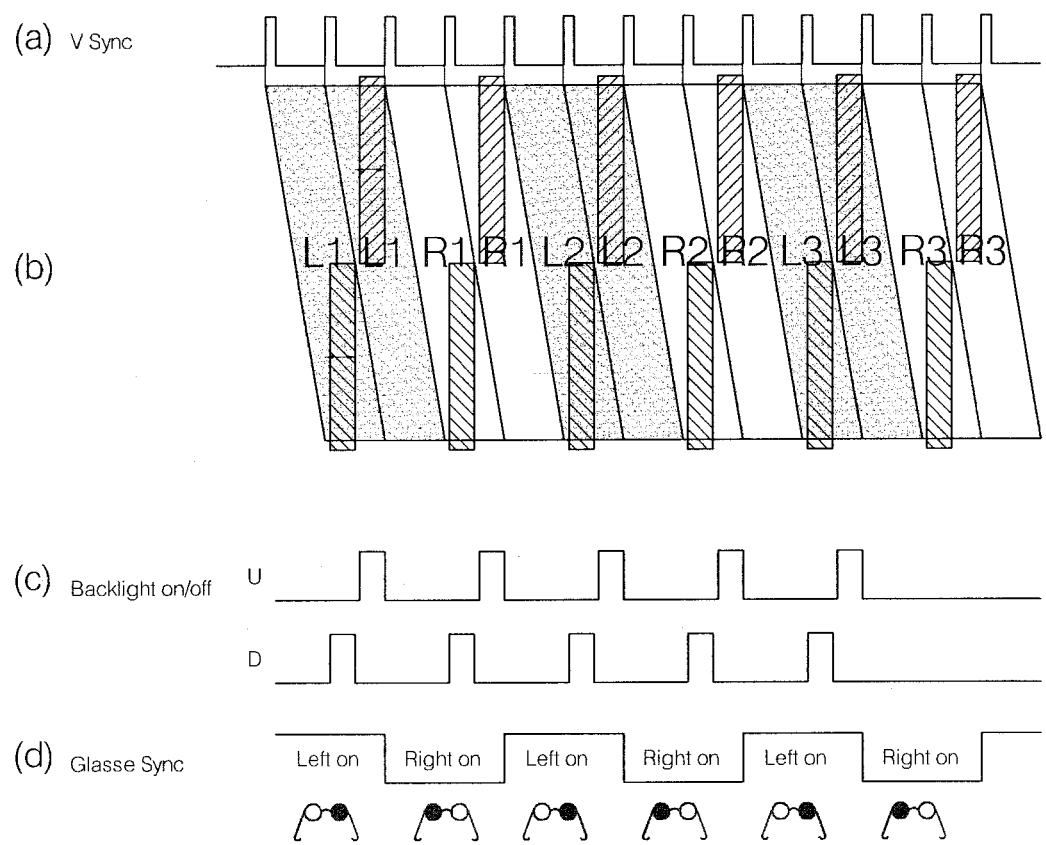

Next, FIG. 16 shows the case where the backlight lamps 252-3 and 252-4 arranged on the lower side of the panel are first turned on and the backlight lamps 252-1 and 252-2 arranged on the upper side of the panel are subsequently turned on, unlike FIG. 12.

Hereinafter, the difference between FIGS. 12 and 16 will be described.

FIG. 16(b) shows the state in which the backlight lamps 252-1 and 252-2 arranged on the upper side of the liquid crystal panel 210 and the backlight lamps 252-3 and 252-4 arranged on the lower side of the liquid crystal panel 210 are turned on during the portion of the display period of the consecutively arranged left-eye image frames or the consecutively arranged right-eye image frames. By such driving, crosstalk, in which adjacent images (the left-eye image and the right-eye image) overlap each other when the 3D image is displayed, is reduced.

FIG. 16(b) shows the state in which the backlight lamps 252-3 and 252-4 arranged on the lower side of the panel are first turned on and the backlight lamps 252-1 and 252-2 arranged on the upper side of the panel are subsequently turned on.

Referring to the drawing, the light is transmitted from the lower side to the central portion of the panel when the backlight lamps 252-3 and 252-4 arranged on the lower side of the panel are turned on and the light is transmitted from the upper side to the central portion of the panel when the backlight lamps 252-1 and 252-2 arranged on the upper side of the panel are turned on.

By differentiating the driving timings of the backlight lamps arranged on the upper and lower sides of the liquid crystal panel 210, it is possible to reduce power consumption when the backlight lamps are driven.

FIG. 16(c) shows an on/off timing of the backlight lamps 252. In the drawing, the backlight lamps 252 are turned on at a high level. The backlight lamps 252-1, 252-2, ..., and 252-4 of FIG. 12 are used in an edge type display device, and the backlight lamps 252-3 and 252-4 arranged on the lower side of the panel are turned on earlier than the backlight lamps 252-1 and 252-2 arranged on the upper side of the panel.

FIG. 16(d) shows an operation signal timing of the shutter glasses 195. According to the operation signal timing of the shutter glasses 195, only the left-eye glass is opened when the left-eye image frames L1, L2 and L3 are displayed and only the right-eye glass is opened when the right-eye image frames R1, R2 and R3 are displayed.

Figure 17:
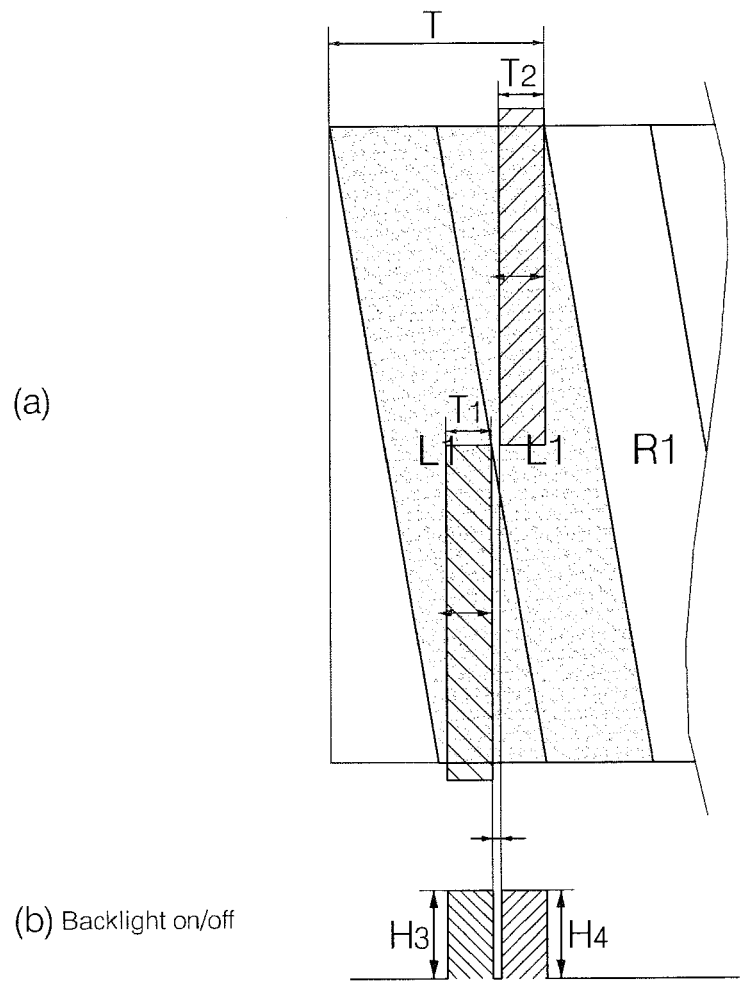

FIG. 17 is an enlarged diagram of the frame arrangement of FIG. 16.

Referring to the drawing, the frame arrangement of FIG. 17 is equal to that of FIG. 13.

Accordingly, the on period T1 of the backlight lamps 252-3 and 252-4 arranged on the lower side of the panel and the on period T2 of the backlight lamps 252-1 and 252-2 of the panel may be variously set within two repeated left-eye image frames L1 and L1, L2 and L2, and L3 and L3 or two repeated right-eye image frames R1 and R1, R2 and R2, and R3 and R3.

Accordingly, the on periods T1 and T2 of the backlight lamps 252 can be changed and thus the brightness of the image can be adjusted.

In the drawing, using the boundary between the consecutive left-eye image frames (the boundary between L1 and L1) and the boundary between the consecutive right-eye image frames (the boundary between R1 and R1) as a reference, the backlight lamps 252-3 and 252-4 arranged on the lower side of the panel are turned on before the boundary and the backlight lamps 252-1 and 252-2 arranged on the upper side of the panel are turned on after the boundary.

That is, the backlight lamps 252-3 and 252-4 arranged on the lower side of the panel may be turned on in the first left-eye image frame L1, L2, or L3 and the backlight lamps 252-1 and 252-2 arranged on the upper side of the panel may be turned on in a second left-eye image frame L1, L2 or L3. Accordingly, it is possible to prevent crosstalk in which the adjacent images are displayed when the 3D image is displayed.

Alternatively, the backlight lamps 252-1 and 252-2 arranged on the upper side of the panel may be turned on in the first left-eye image frame L1, L2, or L3 and the backlight lamps 252-3 and 252-4 arranged on the lower side of the panel may be turned on in a second left-eye image frame L1, L2 or L3. Accordingly, it is possible to prevent crosstalk in which the adjacent images are displayed when the 3D image is displayed.

The current level H3 of the first turned on backlight lamps 252-3 and 252-4 arranged on the lower side of the panel and the current level H4 of the subsequently turned on backlight lamps 252-1 and 252-2 arranged on the upper side of the panel may be different from each other. Preferably, the current level of the subsequently turned on backlight lamps 252 may be greater than the current level of the first turned on backlight lamps 252. Accordingly, the afterimage of an afterimage period when switching the image is reduced and thus crosstalk is reduced.

In the drawing, since the backlight lamps 252-1 and 252-2 arranged on the upper side of the panel are turned on later, the current level H4 of the backlight lamps 252-1 and 252-2 arranged on the upper side of the panel may be greater than the current level H3 of the backlight lamps 252-3 and 252-4 arranged on the lower side of the panel.

In FIG. 17, the on period T1 of the backlight lamps 252-3 and 252-4 arranged on the lower side of the panel and the on period T2 of the backlight lamps 252-1 and 252-2 arranged on the upper side of the panel are spaced apart from each other. Accordingly, it is possible to reduce instantaneous load when the backlight lamps are driven and, as a result, to reduce power consumption when the backlight lamps are driven.

Figure 18:
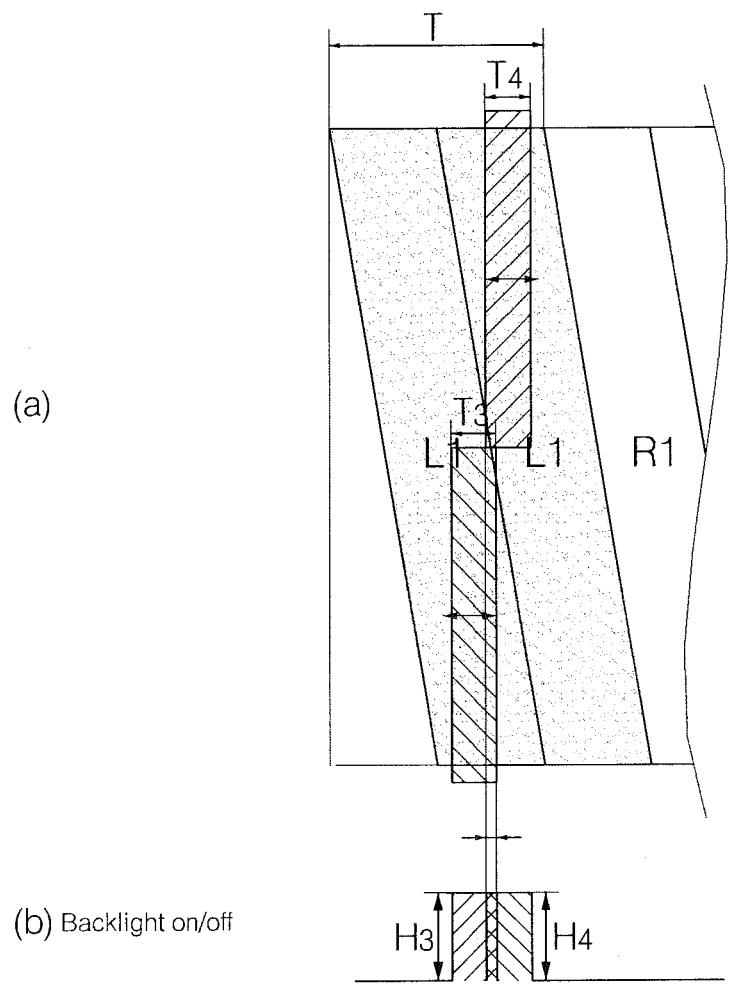

FIG. 18 is similar to FIG. 17, but is different from FIG. 17 in that a portion of the on period T3 of the backlight lamps 252-3 and 252-4 arranged on the lower side of the panel and a portion of the on period T4 of the backlight lamps 252-1 and 252-2 arranged on the upper side of the panel overlap each other. Even in this case, since the on start times are different, it is possible to reduce instantaneous load when the backlight lamps are driven and, as a result, to reduce power consumption when the backlight lamps are driven.

Although, in the drawing, the portion of the on period T3 of the backlight lamps 252-3 and 252-4 arranged on the lower side of the panel and the portion of the on period T4 of the backlight lamps 252-1 and 252-2 arranged on the upper side of the panel overlap each other, the present invention is not limited thereto. When the backlight lamps 252-3 and 252-4 arranged on the lower side of the panel are turned off, the backlight lamps 252-1 and 252-2 arranged on the upper side of the panel may be turned on. That is, the on period T3 and the on period T4 may be adjacent to each other.

The current levels when the 3D image is displayed and when the 2D image is displayed are shown in FIG. 15.

Figure 19:
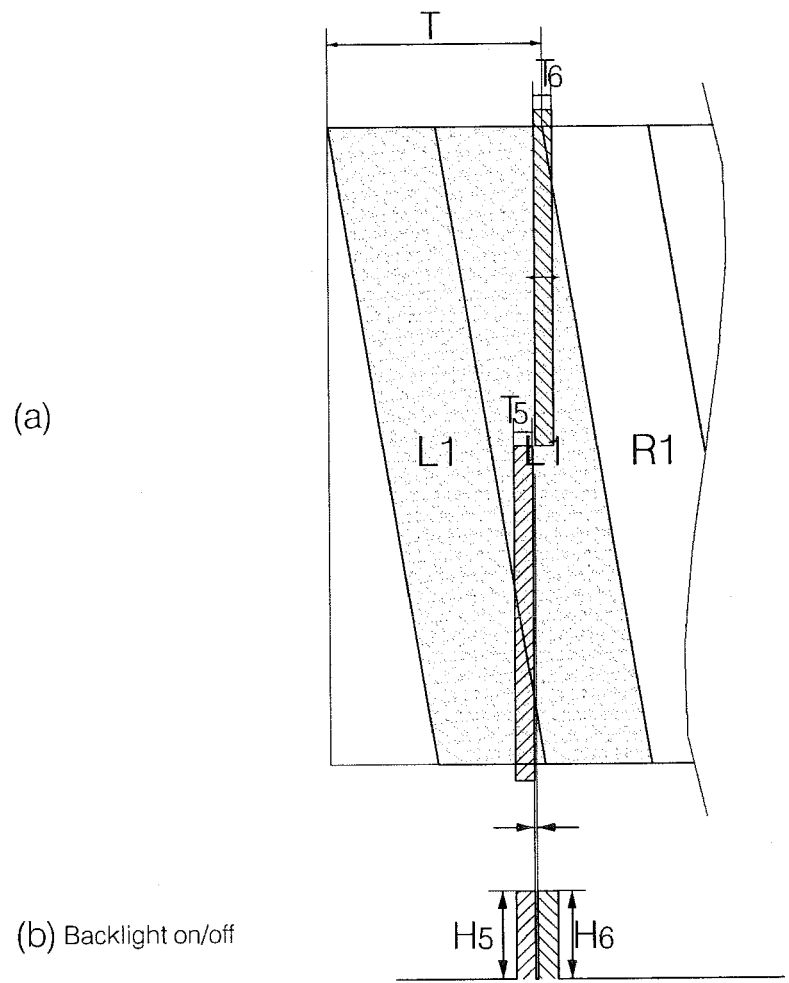

FIG. 19 is similar to FIG. 17, but is different from FIG. 17 in that the backlight lamps 252-3 and 252-4 arranged on the lower side of the panel are first turned on and the backlight lamps 252-1 and 252-2 arranged on the upper side of the panel are subsequently turned on, in at least a last left-eye image frame of the consecutive left-eye image frames and at least a last right-eye image frame of the consecutive right-eye image frames.

That is, the backlight lamps 252-3 and 252-4 arranged on the lower side of the panel and the backlight lamps 252-1 and 252-2 arranged on the upper side of the panel may be sequentially turned on in the second left-eye image frame L1, L2 or L3 or the second right-eye image frame R1, R2 or R3. Accordingly, it is possible to prevent crosstalk in which the adjacent images are displayed when the 3D image is displayed.

The on period T5 of the backlight lamps 252-3 and 252-4 arranged on the lower side of the panel and the on period T6 of the backlight lamps 252-1 and 252-2 arranged on the upper side of the panel may be variously set within two repeated left-eye image frames L1 and L1, L2 and L2, and L3 and L3 or two repeated right-eye image frames R1 and R1, R2 and R2, and R3 and R3, unlike the drawing.

Accordingly, the on periods T5 and T6 of the backlight lamps 252 can be changed and thus the brightness of the image can be adjusted.

In FIG. 19, the on period T5 of the backlight lamps 252-3 and 252-4 arranged on the lower side of the panel and the on period T6 of the backlight lamps 252-1 and 252-2 arranged on the upper side of the panel are spaced apart from each other. Accordingly, it is possible to reduce instantaneous load when the backlight lamps are driven and, as a result, to reduce power consumption when the backlight lamps are driven.

The current level H5 of the first turned on backlight lamps 252-3 and 252-4 arranged on the lower side of the panel and the current level H6 of the subsequently turned on backlight lamps 252-1 and 252-2 arranged on the upper side of the panel may be different from each other. Preferably, the current level H6 of the subsequently turned on backlight lamps 252-1 and 252-2 arranged on the upper side of the panel may be greater than the current level H5 of the first turned on backlight lamps 252-3 and 252-4 arranged on the lower side of the panel. Accordingly, the afterimage of an afterimage period when switching the image is reduced and thus crosstalk is reduced.

FIG. 20 is similar to FIG. 19, but is different from FIG. 19 in that a portion of the on period T7 of the backlight lamps 252-3 and 252-4 arranged on the lower side of the panel and a portion of the on period T8 of the backlight lamps 252-1 and 252-2 arranged on the upper side of the panel overlap each other. Even in this case, since the on start times are different, it is possible to reduce instantaneous load when the backlight lamps are driven and, as a result, to reduce power consumption when the backlight lamps are driven.

Although, in the drawing, the portion of the on period T7 of the backlight lamps 252-3 and 252-4 arranged on the lower side of the panel and the portion of the on period T8 of the backlight lamps 252-1 and 252-2 arranged on the upper side of the panel overlap each other, the present invention is not limited thereto. When the backlight lamps 252-3 and 252-4 arranged on the lower side of the panel are turned off, the backlight lamps 252-1 and 252-2 arranged on the upper side of the panel may be turned on. That is, the on period T7 and the on period T8 may be adjacent to each other.

The image display device and the method for operating the same according to the present invention are not limited to the configurations and the methods of the above-described embodiments, and some or all of the embodiments may be selectively combined such that the embodiments are variously modified.

The method for operating the image display device of the present invention may be implemented as code that can be written to a processor-readable recording medium and can thus be read by a processor included in the image display device. The processor-readable recording medium may be any type of recording device in which data can be stored in a processor-readable manner. Examples of the processor-readable recording medium include a ROM, a RAM, a CD-ROM, a magnetic tape, a floppy disc, an optical data storage, and a carrier wave (e.g., data transmission through the internet). The processor-readable recording medium can be distributed over a plurality of computer systems connected to a network so that computer-readable code is written thereto and executed therefrom in a decentralized manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for operating an image display device including a shutter glass and a display including a plurality of backlight lamps arranged on upper and lower sides of a rear surface of a display panel, the method comprising:
   receiving a 3-Dimensional (3D) image;
   increasing a frame rate of the 3D image;
   alternately aligning a left-eye image and a right-eye image of the 3D image; and
   alternately displaying the aligned left-eye image and right-eye image,
   wherein, in the aligning of the left-eye image and the right-eye image, left-eye image frames and right-eye image frames are consecutively arranged,
   wherein, in the displaying of the aligned left-eye image and right-eye image, using a first boundary between the consecutive left-eye image frames and a second boundary between the consecutive right-eye image frames as a reference, the backlight lamps arranged on the lower side of the display panel are turned on during a first period before the first boundary while the backlight lamps arranged on the upper side of the display panel are off, and the backlight lamps arranged on the upper side of the display panel are turned on during a second period after the first boundary while the backlight lamps arranged on the lower side of the display panel are off, wherein a left glass of the shutter glass opens on during the first period and the second period, wherein a level of current flowing in the backlight lamps arranged on the upper side of the display panel is greater than a level of instantaneous current flowing in the backlight lamps arranged on the lower side of the display panel, wherein an on-period of the backlight lamps arranged on the lower side of the display panel and an on-period of the backlight lamps arranged on the upper side of the display panel are spaced apart from each other, and wherein an on period of the backlight lamps arranged on the upper side of the display panel and an on period of the backlight lamps arranged on the lower side of the display panel are changed such that brightness of the 3D image is adjusted.

2. The method according to claim 1, further comprising:
receiving a 2-Dimensional (2D) image; and
displaying the 2D image,
wherein a product of a time and a level of current flowing in the backlight lamps per unit frame when the 3D image is displayed is less than that when the 2D image is displayed.

3. The method according to claim 1, further comprising:
receiving a 2-Dimensional (2D) image; and
displaying the 2D image,
wherein a level of instantaneous current flowing in the backlight lamps when the 3D image is displayed is greater than that when the 2D image is displayed.

4. The method according to claim 1, wherein the backlight lamps arranged on the lower side of the display panel are turned on during a third period before the second boundary and the backlight lamps arranged on the upper side of the display panel are turned on during a fourth period after the second boundary,
wherein a right glass of the shutter glass opens on during the third period and the fourth period.

5. An image display device comprising:
a shutter glass including a left glass and a right glass;
a frame rate converter configured to increase a frame rate of a 3-Dimensional (3D) image;
a formatter configured to alternately align a left-eye image and a right-eye image of the 3D image; and
a display configured to alternately display the aligned left-eye image and right-eye image,
wherein the display includes a plurality of backlight lamps arranged on upper and lower sides of a rear surface of a display panel, and wherein the formatter consecutively arranges left-eye image frames and right-eye image frames, and wherein, using a first boundary between the consecutive left-eye image frames and a second boundary between the consecutive right-eye image frames as a reference, the backlight lamps arranged on the lower side of the display panel are turned on during a first period before the first boundary while the backlight lamps arranged on the upper side of the display panel are off, and the backlight lamps arranged on the upper side of the display panel are turned on during a second period after the first boundary while the backlight lamps arranged on the lower side of the display panel are off, wherein a left glass of the shutter glass opens on during the first period and the second period, wherein a level of current flowing in the backlight lamps arranged on the upper side of the display panel is greater than a level of instantaneous current flowing in the backlight lamps arranged on the lower side of the display panel, wherein an on-period of the backlight lamps arranged on the lower side of the display panel and an on-period of the backlight lamps arranged on the upper side of the display panel are spaced apart from each other, and wherein an on period of the backlight lamps arranged on the upper side of the display panel and an on period of the backlight lamps arranged on the lower side of the display panel are changed such that brightness of the 3D image is adjusted.

6. The image display device according to claim 5, wherein the display further displays a 2-Dimensional (2D) image, and a product of a time and a level of current flowing in the backlight lamps per unit frame when the 3D image is displayed is less than that when the 2D image is displayed.

7. The image display device according to claim 5, wherein the display further displays a 2-Dimensional (2D) image, and a level of current flowing in the backlight lamps when the 3D image is displayed is greater than that when the 2D image is displayed.

8. The image display device according to claim 5, wherein the backlight lamps arranged on the lower side of the display panel are turned on during a third period before the second boundary and the backlight lamps arranged on the upper side of the display panel are turned on during a fourth period after the second boundary,
wherein a right glass of the shutter glass opens during the third period and the fourth period.

* * * * *